(12) United States Patent
Marte

(10) Patent No.: US 10,018,820 B2
(45) Date of Patent: *Jul. 10, 2018

(54) DIGITAL MICROSCOPE HAVING A CLICK STOP

(71) Applicant: LEICA MICROSYSTEMS (SCHWEIZ) AG, Heerbrugg (CH)

(72) Inventor: Christian Marte, Dornbirn (AT)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 174 days.

This patent is subject to a terminal disclaimer.

(21) Appl. No.: 14/873,596

(22) Filed: Oct. 2, 2015

(65) Prior Publication Data

US 2016/0097923 A1    Apr. 7, 2016

(30) Foreign Application Priority Data

Oct. 6, 2014  (DE) .......................... 10 2014 114 479

(51) Int. Cl.
*F16D 49/18*     (2006.01)
*F16M 11/06*     (2006.01)
(Continued)

(52) U.S. Cl.
CPC ............. *G02B 21/24* (2013.01); *G02B 7/001* (2013.01); *H04N 5/2252* (2013.01); *H04N 5/2257* (2013.01)

(58) Field of Classification Search
CPC ...... G02B 21/24; G02B 7/001; H04N 5/2257; H04N 5/2252
See application file for complete search history.

(56) References Cited

U.S. PATENT DOCUMENTS 2,270,613 A * 1/1942 Young, Jr. .......... G01N 21/9009
209/524
3,762,796 A * 10/1973 Heller .................... F16M 11/08
359/375
(Continued)

FOREIGN PATENT DOCUMENTS

CN        1591077         3/2005
DE        2523725 A *     5/1975
(Continued)

OTHER PUBLICATIONS

Leica Microsystems, Leica DVM2500 and DVM5000 HD—Leica Digital Microscopes—Mobility and Speed for Industrial Quality Control (product brochure), Nov. 2011, Switzerland.

*Primary Examiner* — Sath V Perungavoor
*Assistant Examiner* — Philip Dang
(74) *Attorney, Agent, or Firm* — Hodgson Russ LLP

(57) ABSTRACT

A digital microscope has a stationary stand body (12) and a pivot unit (14) pivotably mounted on the stand body (12). The pivot unit (14) includes an image sensing unit for acquiring images of objects. The microscope has a brake unit (22) for braking and/or immobilizing the pivot unit (14), and an actuation element (44) for releasing the brake unit (22). The pivot unit (14) includes a first connecting element (60) and the stand body (12) has a second connecting element (62). The first and second connecting elements (60, 62) are coupled to one another when the pivot unit (14) is in a predetermined zero position and the actuation element (44) is in an unactuated default position. The connecting elements (60, 62) are moreover coupled to one another when the pivot unit (14) is in the zero position and the actuation element (44) is actuated within a predetermined actuation range.

19 Claims, 18 Drawing Sheets

(51) Int. Cl.
*G02B 21/24* (2006.01)
*G02B 7/00* (2006.01)
*H04N 5/225* (2006.01)

(56) References Cited

U.S. PATENT DOCUMENTS

| | | | | |
|---|---|---|---|---|
| 3,762,797 | A * | 10/1973 | Heller | F16M 11/08 359/375 |
| 4,548,373 | A * | 10/1985 | Komura | A61B 6/105 188/171 |
| 4,815,832 | A * | 3/1989 | Nagano | A61B 90/25 248/123.11 |
| 5,825,536 | A * | 10/1998 | Yasunaga | A61B 90/25 248/123.11 |
| 6,129,319 | A * | 10/2000 | Metelski | F16M 11/10 248/123.2 |
| 7,136,221 | B2 * | 11/2006 | Strobel | G02B 7/001 248/123.11 |
| 7,436,484 | B2 * | 10/2008 | Van Der Wijst | G03F 7/70266 355/52 |
| 7,611,481 | B2 * | 11/2009 | Cleary | A61B 17/205 604/27 |
| 8,121,666 | B2 * | 2/2012 | Otsuka | F16M 11/10 248/415 |
| 8,144,189 | B2 * | 3/2012 | Fujiwara | G02B 7/004 348/45 |
| 8,444,631 | B2 * | 5/2013 | Yeung | B25J 9/047 606/1 |
| 8,618,479 | B2 * | 12/2013 | Kashihara | G02B 21/0004 250/306 |
| 8,674,301 | B2 * | 3/2014 | Takagi | G02B 21/0004 250/306 |
| 2002/0166942 | A1 | 11/2002 | Metelski | |
| 2005/0023086 | A1 * | 2/2005 | Szilagyi | F03G 7/065 188/67 |
| 2007/0299427 | A1 * | 12/2007 | Yeung | B25J 9/047 606/1 |
| 2010/0128367 | A1 * | 5/2010 | Beckenbach | G02B 7/023 359/820 |
| 2013/0006270 | A1 * | 1/2013 | Schmoll | A61B 34/20 606/130 |
| 2013/0140411 | A1 * | 6/2013 | Frick | F16M 11/00 248/123.11 |
| 2013/0140424 | A1 * | 6/2013 | Frick | F16M 11/00 248/550 |
| 2013/0252517 | A1 * | 9/2013 | DeCore | B24B 23/026 451/344 |
| 2014/0165963 | A1 * | 6/2014 | Langham | F02D 41/021 123/350 |
| 2014/0285880 | A1 * | 9/2014 | Southard | G02B 26/06 359/364 |

FOREIGN PATENT DOCUMENTS

| | | |
|---|---|---|
| JP | 2001059599 | 3/2001 |
| JP | 2005143970 A | 6/2005 |
| JP | 2006337470 | 12/2006 |
| JP | 2012018813 A | 1/2012 |
| JP | 2013174824 | 9/2013 |

\* cited by examiner

DIGITAL MICROSCOPE HAVING A CLICK STOP

CROSS REFERENCE TO RELATED APPLICATIONS

This application claims priority of German patent application number 10 2014 114 479.1 filed Oct. 6, 2014, the entire disclosure of which is incorporated by reference herein.

FIELD OF THE INVENTION

The invention relates to a digital microscope that encompasses a stationary stand body and a pivot unit that is mounted on a shaft of the stand body, pivotably around the longitudinal axis of that shaft. The pivot unit comprises an image sensing unit for acquiring images of objects to be examined microscopically. The microscope furthermore has a brake unit for braking and/or immobilizing the pivot unit, as well as an actuation element for releasing that brake unit.

BACKGROUND OF THE INVENTION

High-grade digital microscopes encompass a stationary stand body with which the microscope is mounted on its installation surface, as well as a pivotable base unit in which the image sensing unit and an objective system are received. This pivotable pivot unit is pivotable around a rotation axis relative to the stand body so that the objects to be examined microscopically can be viewed from different angles; this can be useful in particular for the assessment of depth.

Once the pivot unit has been moved out of the position in which the pivot unit is arranged uprightly above the microscope stage, i.e. in which the beam path is directed vertically, with manually adjustable microscopes it is difficult to position them again exactly in that position. Although approximate positioning in the initial position can easily be accomplished by the operator, accurate positioning is difficult to estimate. In many application instances, however, it is necessary for the pivot unit to be arranged as accurately as possible in the initial position.

One possibility for circumventing this problem is to use pivot units that are adjustable in motorized fashion, in which the initial position can be arrived at correspondingly via the motor. Motorized systems of this kind have the disadvantage, however, that they are costly and space-intensive. In addition, electrical power is always required for adjustment of the pivot unit.

SUMMARY AND ADVANTAGES OF THE INVENTION

An object of the invention is to describe a digital microscope whose pivot unit is easily positionable in a predetermined zero position, and which is easy to operate.

This object is achieved by a digital microscope having the features of Claim 1. Advantageous refinements of the invention are described in the dependent claims.

According to the present invention the pivot unit encompasses a first connecting element, for example a latching element, and the stand body encompasses a second connecting element, for example a second latching element, embodied complementarily to that first connecting element. The first connecting element and the second connecting element are coupled to one another when the pivot unit is arranged in a predetermined zero position, provided the actuation element is arranged in an unactuated default position or the actuation element is actuated within a predetermined first actuation range. For example, the first connecting element latches into the second connecting element.

The result of the coupling of the first and the second connecting element is that an operator of the microscope can easily return to the zero position at any time. In particular, if the pivot unit has previously been moved out of the zero position and if the actuation element has been actuated within the first actuation range, the operator can move said unit until a connection of the first connecting element with the second connecting element occurs. The connection, preferably a latching connection, signals directly and intuitively to the operator that the pivot unit is arranged in the zero position.

The zero position is, in particular, the position in which the optical axis of the microscope or the beam path of the microscope is arranged perpendicularly to the surface of the microscope stage on which the objects to be examined microscopically can be arranged. In this zero position, the zoom of the microscope is also calibrated with respect to the surface of the microscope stage. Alternatively, the zero position can also be any other predetermined position. The zero position can thus, in particular, also be a position in which the optical axis of the microscope or the beam path of the microscope is not arranged perpendicularly to the surface of the microscope stage on which the objects to be examined microscopically can be arranged.

The zero position is, in particular, selected in such a way that the pivot unit can be pivoted, proceeding from the zero position, through the same angle in both directions, so that the zero position represents the center position.

The brake unit is arranged, in particular, inside the pivot unit, so that the brake unit is concurrently pivoted.

It is particularly advantageous that, when the pivot unit is arranged in the zero position and when the actuation element is actuated within a predetermined second actuation range that is different from the first actuation range and also does not overlap it, the first connecting element is nevertheless not coupled to the second connecting element, for example they are not latched into one another. What is achieved thereby is that the operator can select, as a function of how far he or she actuates the actuation element, whether a coupling of the connecting elements is or is not to occur upon movement into the zero position. This second actuation range ensures in particular that the pivot unit can be moved from the one side, through the zero position, to the other side without coupling occurring. This is very useful in particular in a context of video imaging via the image sensing unit, since otherwise vibrations and shocks could occur due to, for example, the latching, i.e. upon coupling of the connecting elements. In addition, coupling as a rule intuitively causes operators to modify the force exerted in this region, and thus the rate at which the pivot unit is moved by them, which would likewise produce irregularities in video images.

The first actuation range is arranged in particular between the default position and the second actuation range. It is furthermore advantageous if the first actuation range directly adjoins the default position and if the second actuation range directly adjoins the first actuation range.

In particular, the brake unit is also released to different extents depending on the actuation of the actuation element, i.e. the braking force that is generated can be steplessly adjusted depending on how far the actuation element is actuated. The result is that, thanks to the definition of two actuation ranges and not just individual actuation points, the braking force can be respectively regulated within the actuation ranges.

Within the first actuation range the brake unit does, in particular, exert a braking force, but it is only of such magnitude that adjustment of the pivot unit is nevertheless still possible. Conversely, if the actuation element is in its default position, i.e. is unactuated, the braking force is then so strong that pivoting of the pivot unit is not possible.

The actuation element can, in particular, be actuated over a predetermined maximum actuation travel. The two actuation ranges are, in particular, selected in such a way that the first actuation range covers approximately the first half, adjacent to the default position, of the maximum actuation travel, and the second actuation range covers the second half, adjacent to the first half, of the maximum actuation travel.

The result of this is that sufficient latitude is available for both the first and the second actuation range, and that simple and intuitive operation by the operator is achieved.

The transition between the two actuation ranges can, in particular, be smooth.

It is furthermore advantageous if, upon an actuation of the actuation element both within the first actuation range and within the second actuation range, the brake unit is released at least sufficiently far that pivoting of the pivot unit is possible.

The connection between the first and the second connecting element is, in particular, embodied in such a way that the connection automatically releases upon pivoting of the pivot unit out of the zero position, and/or conversely is automatically established upon pivoting of the pivot unit from a position outside the zero position into the zero position, provided the actuation element is respectively actuated within the first actuation range. What is achieved by way of this automatic release and establishment of the latched connection is that no action is necessary therefor, but instead it occurs automatically upon pivoting of the pivot unit, respectively upon movement into and movement out of the zero position. The latched connection is thus intended not to produce an immobilization effect, but merely to produce a position indication.

The connection is embodied in particular in such a way that upon release and re-establishment of the connection, for example the latched connection, by pivoting of the pivot unit, an acoustic, haptic, and/or optical signal, in particular a "click," is outputted. The operator can thereby very easily and intuitively perceive the zero position. This signal is embodied in particular in such a way that no electrical components are necessary therefor, but instead it is outputted purely by the mechanical establishment of the connection, for example the latched connection.

The connection, for example a latched connection, is embodied in particular in the form of a so-called "click stop" that indicates the zero position by way of a corresponding "click."

In a particularly preferred embodiment the first connecting element, for example a latching element, is arranged movably, in particular linearly displaceably, along a predetermined path. When the actuation element is arranged in its default position, i.e. when the actuation element is not actuated, the first connecting element is arranged in an initial position in which it engages into the second connecting element, for example a second latching element, if the pivot unit is arranged in the zero position. The connecting element is furthermore embodied, and/or coupled to the actuation element, in such a way that upon an actuation of the actuation element within the first actuation range, the first connecting element is moved at most sufficiently far out of its initial position that it couples, for example latches, at least partly into the second connecting element, always assuming that the pivot unit is arranged in the zero position. It is particularly advantageous if the coupling is accomplished purely mechanically, so that adjustment is possible even without electrical power. It is furthermore particularly advantageous if, upon an actuation of the actuation element within the first actuation range, the first connecting element remains entirely in its initial position so that the connection is always established.

Conversely, upon an actuation of the actuation range within the second actuation range, the first connecting element, for example a latching element, is moved sufficiently far out of its initial position that it no longer connects to, for example latches into, the second connecting element, for example a latching element, even when the pivot unit is arranged in the zero position.

It is thereby easy to ensure that latching occurs only upon an actuation within the first actuation range, and depending on the actuation it is thus possible to select whether the zero position is to be "overridden" or a signal is to be outputted.

It is particularly advantageous if the first connecting element, for example a latching element, is biased into the initial position via an elastic element. What is achieved thereby is that it always automatically moves back into the initial position. A further result achieved thereby is that if the connecting element was not previously arranged in the initial position (for example because the pivot unit is not arranged in the zero position), it is automatically moved into that initial position. If the pivot unit is arranged outside the zero position, the first connecting element is then moved out of the initial position, in particular against the return force of the elastic element, thanks to contact with an abutment surface. If the pivot unit is moved into the zero position, so that the first connecting element travels into the vicinity of the second connecting element, it is then moved by the return force of the elastic element into that second connecting element, and thus into the initial position. Conversely and correspondingly, upon movement of the pivot unit out of the zero position in a context of actuation of the first actuation element within the first actuation element range, the first connecting element is moved out of the initial position again, against the return force of the spring, by way of contact with the second connecting element and/or with the abutment surface.

The elastic element is, in particular, a spring, for example a compression spring. A particularly simple configuration is thereby achieved.

The first connecting element is embodied in particular as a pin. The second connecting element is correspondingly embodied complementarily as a recess, in particular as a recess within a disk arranged coaxially with the shaft. If the actuation element is not actuated, or is actuated only within the first actuation range, the pin then latches into the recess if the pivot unit is arranged in the zero position. The pin has, in particular, a rounded, in particular a semi-spherical end with which it engages into the recess. The recess correspondingly also has, in particular, a beveled, rounded, or semi-spherical shape. What is achieved thereby is that upon movement of the pivot unit out of the zero position, the first connecting element is moved by this beveling out of its initial position. Jamming and a blocking effect of the connection, for example a latched connection, are, in particular, thereby avoided. Preferably this beveling or rounding ensures that what is accomplished by the latched connection is not immobilization but instead only signaling of the zero position.

It is particularly advantageous if the pin comprises an elongated hole into which a further pin, fixedly connected to the actuation element, engages, the elongated hole being embodied in such a way that upon actuation of the actuation element within the first actuation range, the further pin is moved inside the elongated hole but without thereby moving the one pin, i.e. the first connecting element. What is achieved thereby is that upon an actuation of the actuation element within the first actuation range, the first connecting element is left in its initial position or the connection to the second connecting element is thus established.

It is furthermore advantageous if the brake unit encompasses a brake element, biased with the aid of a further elastic element into a braked position, that contacts the shaft in the braked position. This brake element is movable by manual actuation of the actuation element, against the return force of the further elastic element, from the braked position into a released position. The actuation element is furthermore coupled to the brake element via a coupling unit. In this released position, in particular, pivoting of the pivot unit around the longitudinal axis of the shaft is possible.

In a preferred embodiment the actuation element is coupled purely mechanically to the brake element with the aid of a coupling unit. Alternatively or additionally, a magnetic and/or electrical coupling is also possible.

The advantage achieved thanks to the preferably purely mechanical coupling is that pivoting of the pivot unit is possible even without the delivery of electrical current. The elastic element furthermore ensures that the brake unit always automatically immobilizes the pivot unit by the fact that without actuation of the actuation element, the brake element is always arranged in the braked position and thus exerts the necessary braking force. Inadvertent pivoting of the pivot unit thus cannot occur, so that property damage and personal harm are prevented. In addition, a purely mechanically coupled brake element of this kind, which produces its braking effect via contact with the shaft and thus via the frictional force thereby created, allows the braking force to be capable of being steplessly regulated by the operator depending on how far he or she in fact actuates the actuation element. This makes possible, in particular, precise adjustment of the position of the pivot unit. The actuation element is only minimally actuated for this, so that a braking force is still being exerted but it is only of such magnitude that adjustment of the pivot unit is nevertheless possible; the entire weight of the pivot unit does not need to be retained by the operator, that weight instead being for the most part applied by the braking force. The operator can thus concentrate on the specific precise positioning operation and can perform it substantially more accurately than if he or she needed to hold the entire pivot unit.

The braking force is generated in particular by the frictional connection between the brake element and the shaft. The braking force here depends in particular on the force with which the brake element is pressed against the shaft. That force is in turn applied by the elastic element; upon an actuation of the actuation element, a force directed against the return force of the elastic element is applied, thereby decreasing the resultant force acting on the shaft due to the brake element. so that a smaller braking force is also generated. This makes possible the above-described stepless regulation of the braking force.

In a particularly preferred embodiment of the invention, the brake unit encompasses several brake elements each biased into the braked position by a respective elastic element. All the brake elements are coupled to the actuation element in such a way that they are movable with the aid of the actuation element from the braked position into the released position. The result of providing multiple brake elements, which in particular are arranged at different points on the shaft, is that a greater, and in particular homogeneously distributed, braking force is achieved, so that braking and immobilization of the pivot unit can occur reliably and securely.

The brake elements are, in particular, embodied identically. The elastic elements as well are preferably embodied identically. Alternatively, in an embodiment, different brake elements and/or different elastic elements can also be used. In embodiments having multiple brake elements the features described below, with which the brake elements and elastic elements can be further developed, can be used both for all brake elements and respectively only for some of the brake elements. In particular, different brake elements having some of the features described below can be combined with one another.

The result of coupling all the brake elements to a single actuation element is that the operator also correspondingly needs to actuate only one actuation element, and particularly simple operation is thus ensured. The brake element or elements are embodied, in particular, as radial pistons, i.e. pistons that exert radially directed forces on the shaft when they are pressed against it. With radial pistons of this kind, on the one hand a particularly simple configuration is achieved and on the other hand very good force transfer to the shaft is ensured.

The radial piston or pistons preferably each have a contact region, beveled at a predetermined angle, for contacting the shaft, the force being applied by the radial piston in particular via that contact region. With a beveled region, force transfer occurs in particular along a line. The contact region is beveled preferably at an angle of between 20° and 45°, in particular approximately 30°, relative to the enveloping surface of the radial piston. It is correspondingly at, in particular, an angle of between 45° and 70°, preferably 60°, with respect to the end surface.

In an alternative embodiment of the invention the contact region can also have a different shape. In particular, the contact region can also be embodied in the shape of a cylinder segment and, in particular, can be coordinated exactly with the diameter of the shaft, so that a very large contact region is achieved and force can be transferred not only along a line but over a large area. Even more reliable and uniform force transfer, and a better braking and immobilization effect, are thereby achieved.

The elastic element or elements with which the brake elements are biased into the braked position are embodied in particular as springs, preferably as compression springs. A particularly simple and reliable configuration is thereby achieved. Alternatively, for example, rubber blocks can also be used.

In a particularly preferred embodiment the brake element is steplessly movable from the braked position into the released position, so that a different braking force is respectively applied depending on the position of the brake element. The result of this is that the braking force can be regulated steplessly, in particular continuously. Operating convenience is thereby enhanced, and intuitive operation is enabled.

The actuation element encompasses in particular a lever pivotable around a pivot axis relative to a housing of the pivot unit. This lever is, in particular, biased into a default position by the elastic element of the brake unit and/or by further elastic elements, this default position being that position in which the actuation element is not actuated, and which the actuation element thus assumes when the brake element or elements is or are arranged in the braked position.

It is particularly advantageous if the lever is pulled toward the operator for release from said default position, thereby enabling particularly simple and convenient operation.

In a particularly preferred embodiment the brake unit encompasses at least two, preferably four brake elements embodied as radial pistons, each two of said radial pistons being arranged opposite one another with reference to a center plane of the shaft, these oppositely arranged radial pistons each being biased in opposite directions, i.e. toward one another, by a respective elastic element. An even number of radial pistons, for example two, four, six, or eight radial pistons, is accordingly preferred, two corresponding ones of the radial pistons described above respectively being arranged opposite one another.

A particularly simple and compact configuration is thereby achieved. A uniform application of force is moreover generated. The radial pistons are in particular arranged and/or embodied in such a way that their force introduction points are distributed symmetrically over the circumference of the shaft.

It is furthermore advantageous if a respective intermediate element fixedly connected to the actuation element is arranged between the two radial pistons biased toward one another, and if the two radial pistons, as a result of their biasing, press via a respective elastic element against oppositely located sides of that intermediate element. Upon an actuation of the actuation element, the intermediate element becomes tilted in such a way that the distance between the radial pistons becomes greater as a function of the actuation travel of the actuation element, i.e. as a function of how far the actuation element is moved out of its default position, so that the radial pistons are moved from the braked position toward the released position. In particular, the tilting of the intermediate element causes it to become skewed, so that it contacts the radial pistons with its edges and pushes them apart. A very reliable, compact construction of simple configuration is thereby achieved. This construction furthermore makes it possible for the actuation element, as a result of this clamping of the intermediate element (joined fixedly to the actuation element) between the two biased radial pistons, to be automatically biased by the radial pistons into its default position, so that separate elastic elements do not need to be provided for this purpose.

The tilting of the intermediate element is accomplished in particular around the same pivot axis as the pivoting of the lever upon actuation thereof. In particular, the intermediate elements, and the bearings with which the lever is mounted on the housing rotatably therearound, are embodied integrally, thereby achieving a particularly simple configuration and reliable operation.

When the radial pistons are arranged in the braked position, their end faces then contact the intermediate element, which is arranged at a predetermined angle relative to the horizontal. Upon tilting of the intermediate element, its surfaces likewise become correspondingly tilted, so that the angle with respect to the horizontal becomes greater and, as a result, the distance between the radial pistons biased toward one another becomes greater. The increase in the distance in turn decreases the force with which the radial pistons are pressed against the shaft, so that the braking force becomes correspondingly reduced.

In a particularly preferred embodiment the actuation element is biased, via the elastic element with which the brake element is biased the braked position, into a default position in which the actuation element is arranged when the brake element is arranged in the braked position. Alternatively or additionally, the actuation element can also be biased into the default position via further, separate elastic elements, for example springs.

In a particularly preferred embodiment a further elastic element is provided whose return force counteracts the weight of the pivot unit upon pivoting of the pivot unit out of a predetermined zero position.

"Counteracting the weight" is understood to mean in particular that the torque, called the "return moment," generated by the return force of the pivot unit with reference to the rotation axis of the pivot unit, i.e. the longitudinal axis of the shaft, counteracts, in particular is oppositely directed to, the torque, called the "tangential moment," generated by the weight of the pivot unit around the longitudinal axis of the shaft, i.e. the rotation axis of the pivot unit.

What is achieved thereby is that in the immobilized state, i.e. with the brake unit arranged in the braked position, the entire torque of the pivot unit does not need to be absorbed by the brake unit, but instead at least a portion of the torque is also absorbed by the elastic element. In addition, when the brake system is released, an operator thereby needs to exert a smaller force in order to pivot the pivot unit than if the elastic element were not provided, so that simpler operation is possible. The result is in particular to prevent the pivot unit from undesirably moving in uncontrolled fashion, thus causing property damage or personal harm. Because the brake system thus needs to exert a smaller braking force it can thus be of smaller dimensions, so that a compact and economical configuration is achieved.

In a preferred embodiment the elastic element is fastened on the stand body so that the latter does not need to be pivoted together with the pivot unit. A particularly simple configuration is achieved thereby. In an alternative embodiment of the invention the elastic element can also be part of the pivot unit and is thus pivoted along with it.

In a particularly preferred embodiment the elastic element is embodied in the form of a torsion spring. A particularly simple, economical, and stable configuration is thereby achieved.

The torsion spring is in particular arranged in such a way that the longitudinal axis of the torsion spring coincides with the longitudinal axis of the shaft. The "longitudinal axis of the torsion spring" is understood in particular to mean the longitudinal axis of the cylinder resulting from the turns of the torsion spring. What is achieved thereby is that the torsion spring is always loaded by an amount equal to the angle through which the pivot unit is pivoted. The result thereof is in particular that upon pivoting of the pivot unit out of the zero position in both directions, the torsion spring is correspondingly identically loaded in each case, and the same return force and thus the same counter-moment are thus exerted. The counter-moment is, in particular, that moment which is generated by the return force of the torsion spring around the rotation axis of the pivot unit, i.e. the longitudinal axis of the shaft.

"Longitudinal axes" are understood in the context of this Application in particular as the respective mathematical concept of an axis, i.e. an infinite straight line. The longitudinal axis is thus, in particular, not restricted to the length of the component.

In a particularly preferred embodiment the stand body encompasses a gate, and the pivot unit encompasses a rod that is fixedly connected to the pivot unit and projects into the gate. The result is to achieve on the one hand guidance of the pivot unit upon pivoting thereof with respect to the stand body, and on the other hand a limitation of the maximum possible pivoting of the pivot unit out of the zero position. The gate is, in particular, embodied in such a way that the pivot unit can be pivoted out of the zero position in two opposite directions within a symmetrical pivoting range. In particular, the pivot unit can be respectively pivoted 60° in both directions out of the zero position, thus yielding, in particular, a pivoting range of 120°. This limitation has the advantage that the maximum tangential force of the weight produced at a tilt of 60° in both directions, i.e. that force which produces the torque, is approximately linear with respect to the angle through which the pivot unit is pivoted, so that an approximately uniform component can be applied as a counter-moment by a spring having a linear characteristic curve.

The gate is preferably embodied in the shape of a circular segment, the center point of the circle being located on the rotation axis of the pivot unit, i.e. on the longitudinal axis of the shaft.

It is furthermore advantageous if the torsion spring is arranged rotatably on a stub shaft or on a shaft, and if the ends of the wire of the torsion spring are angled with respect to the actual turns of the torsion spring in such a way that a gap is constituted between them. Arranged at least in part in this gap are on the one hand the rod guided in the gate, and on the other hand a projection of the stand housing.

What is achieved thereby is that upon pivoting of the pivot unit out of the zero position in a first direction, the first end of the wire of the torsion spring braces against the projection and the second end of the wire of the torsion spring is entrained by the rod, so that with increasing pivoting of the pivot unit out of the zero position, the torsion spring is correspondingly further loaded and a greater return force is applied. Conversely, upon pivoting of the pivot unit out of the zero position in a second direction opposite to the first direction, the first end of the wire of the torsion spring is entrained by the rod whereas the second end of the wire of the torsion spring braces against the projection. Here as well, the spring is again correspondingly increasingly loaded, thus resulting in an increasing return force as a function of the deflection angle of the pivot unit. A further result of this configuration is in particular that the same return force acts respectively for an identical deflection in the first and in the second direction. The above-described configuration furthermore enables simple assembly, since the spring simply needs to be slid on and does not need to be laboriously fastened.

It is furthermore advantageous if the longitudinal axis of the stub shaft coincides with the longitudinal axis of the shaft on which the pivot unit is mounted, so that a particularly simple configuration is produced and the force relationships described above are ensured.

In particular, in the zero position the rod does not contact either of the two ends of the torsion spring, so that in the zero state it is not loaded and thus does not exert a return force. This is also not necessary in the zero position, since no torque is in any case proceeding from the pivot unit.

It is particularly advantageous if the elastic element is in general unloaded when the pivot unit is arranged in the zero position. Fatigue effects on the elastic element are, in particular, thereby avoided.

It is particularly advantageous if the elastic element is embodied or arranged in such a way that its return moment that is brought about by the return force counteracts the tangential moment that is brought about by the tangential force that results upon division of the weight of the pivot unit, acting at the center of gravity of the pivot unit, into a radial force directed along the longitudinal axis of the shaft, and that same tangential force. The tangential moment is obtained in particular by multiplying the tangential force by the standard distance of the tangential force from the rotation axis. The return moment is preferably approximately the same as or greater than the tangential moment for every orientation of the pivot unit.

According to a simplified model, the weight of the pivot unit can be imagined as a force acting at the center of gravity of the pivot unit. This weight can be divided, at any position of the pivot unit, into a tangential force and a radial force that is directed from the center of gravity to the rotation axis of the pivot unit and that thus generates no torque around the rotation axis of the pivot axis. This division yields a further force (the tangential force) that is correspondingly orthogonal to the radial force directed with respect to the rotation axis, and is thus also orthogonal to a connecting line between the center of gravity and the rotation axis of the pivot unit. This tangential force is responsible for generating the tangential moment. The return force produces the return moment that is directed against the tangential moment, i.e. has an opposite rotation direction.

The return moment is greater than or equal to the tangential moment at least in a portion of the pivoting range, preferably over the entire pivoting range. This makes possible a particularly simple pivoting motion of the pivot unit, in which the user can always reliably and accurately control the pivot unit without a great exertion of force.

The elastic element is furthermore, in particular, selected in such a way that in at least a portion of the pivoting range, preferably over the entire pivoting range, the return moment corresponds to 0.8 times to 1.2 times the tangential moment. What is achieved thereby is that the resultant moment is equal at least in a portion of the range, preferably always, to at most +/−20% of the tangential moment, so that the force to be applied by the operator or by the brake unit is small, and the pivot unit is prevented from springing away in both directions when the brake unit is released.

The return moment is obtained in particular as the product of the return force of the elastic element and the distance of the return force from the rotation axis. The tangential moment is correspondingly obtained, in particular, as the product of the tangential force and the distance of the tangential force from the rotation axis.

The return moment ($M_R$) and the tangential moment ($M_T$) in particular satisfy, at least in a portion of the pivoting range, the equation:

$$M_R >= M_T$$

It is particularly advantageous if this equation is satisfied for any pivoting of the pivot unit out of the zero position through at least 83%, preferably at least 67%, in particular at least 50% of the maximum pivot angle. The equation is thus satisfied, in particular, at the respective ends of the pivoting range, i.e. for a pivoting operation between 83% and 100% or between 67% and 100% or between 50% and 100% of the maximum pivot angle. Severe impact against the stops in order to limit the pivoting range is thereby avoided.

In a particularly preferred embodiment this equation is satisfied for the entire pivoting range.

It is particularly advantageous if this equation is satisfied for any pivoting of the pivot unit out of the zero position through at least 50°, preferably at least 40°, in particular at least 30°. In a particularly preferred embodiment this equation is satisfied for the entire pivoting range.

In the context of a maximum pivot angle of 60°, the aforementioned equation is thus satisfied in particular for a pivoting operation between 50° and 60° or between 40° and 60° or between 30° and 60° out of the zero position.

This can be achieved in particular, in the context of a deflection of at most 60° in each direction viewed from the zero position, by an elastic element having a linear characteristic curve, since although the tangential moment is proportional to the sine of the pivot angle, the latter is nevertheless approximately linear in a range of 60° around the zero point.

In a particularly preferred embodiment the shaft is hollow. This has the advantage that it can serve as a cable conduit through which wiring can be provided between the stand base and the components arranged in the pivot unit. This has the advantage that even upon pivoting of the pivot unit, the wiring cannot be detached and is not in the way.

It is furthermore advantageous if the pivot unit encompasses a zoom system and/or an objective system having multiple objectives selectably introducible into the beam path. A different magnification of the object can be achieved depending on the objective.

The objectives are embodied in particular as parfocal objectives, which has the advantage that different objectives can be interchanged with no occurrence of a focus shift, so that no readjustment by the operator is necessary.

It is moreover particularly advantageous if the objectives are coordinated at the factory with the predetermined distance between the longitudinal axis of the shaft, i.e. the rotation axis of the pivot unit, and the position in which the respectively selected object is arranged when it is used, i.e. the operating position. The result of this coordination of the objectives with the rotation axis of the pivot system is to implement eucentric pivoting of the pivot unit, so that the operator does not need to carry out new adjustment operations upon pivoting of the pivot unit.

BRIEF DESCRIPTION OF THE DRAWING VIEWS

Further features and advantages of the invention are evident from the description that follows, which explains the invention in further detail with reference to exemplifying embodiments in conjunction with the appended Figures, in which.

DETAILED DESCRIPTION OF THE INVENTION

Figure 1:
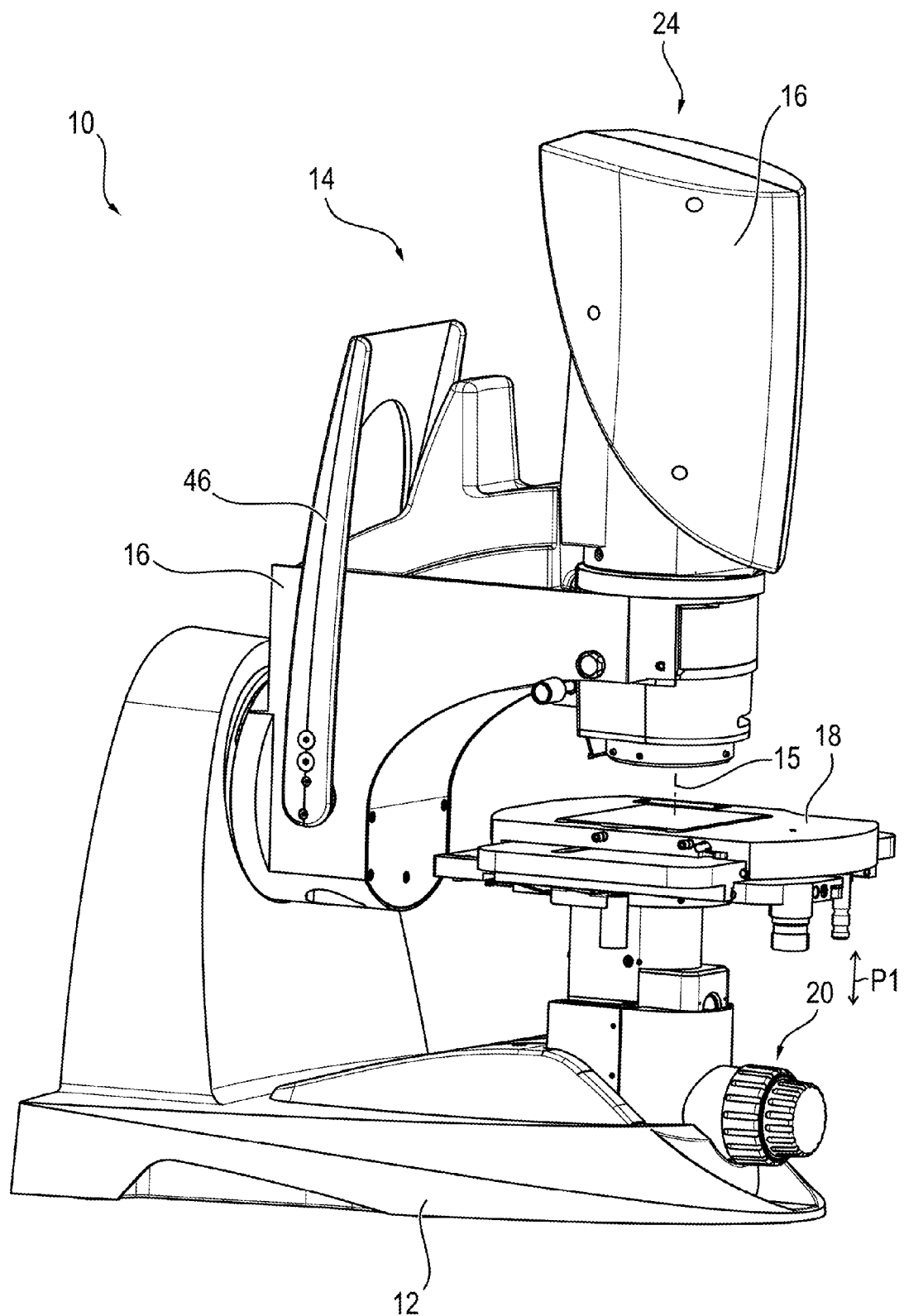
FIG. 1 is a schematic perspective depiction of a microscope.

FIG. 1 is a schematic perspective depiction of a digital microscope 10. Microscope 10 encompasses a stationary stand body 12 with which microscope 10 can be placed on a surface.

Microscope 10 furthermore has a pivot unit 14 pivotable relative to said stand body 12. The pivotable fastening is also described in further detail below in conjunction with FIG. 2.

Pivot unit 14 encompasses at least an image sensing unit with which an image of the objects to be examined microscopically can be acquired. In particular, using this image sensing unit it is possible to acquire not only individual images but also videos, which allow observation from different viewing angles of the object to be examined microscopically.

Pivot unit 14 furthermore comprises an objective system and/or a zoom system with which different magnifications of the objects to be examined microscopically can be set. The objective system has, in particular, a plurality of objectives, one of which can respectively be swung selectably into the beam path of microscope 10 so that said swung-in objective is currently being used. The beam path or optical axis of microscope 10 is labeled in FIG. 1 with the reference character 15.

The image sensing unit, which is in particular at least one camera, and the objective system, are not visible in FIG. 1 because they are concealed by a housing 16 of pivot unit 14.

The objectives of the objective system are, in particular, embodied to be parfocal, so that an objective change does not necessitate refocusing by the operator. The objectives are, in particular, coordinated with the distance between the rotation axis around which pivot unit 14 is rotated and the interface of the objectives, i.e. the region in which the objectives are arranged; this yields a eucentric system, the consequence being that refocusing need not occur when pivot unit 14 is pivoted relative to stand body 12.

Also fastened on stand body 12 is a stage 18 on which the objects to be examined microscopically are placed. This microscope stage 18 can be displaced in the direction of double arrow P1 relative to stand base 12 with the aid of adjusting wheels 20, thereby enabling focusing of the objects to be examined microscopically.

Figure 2:
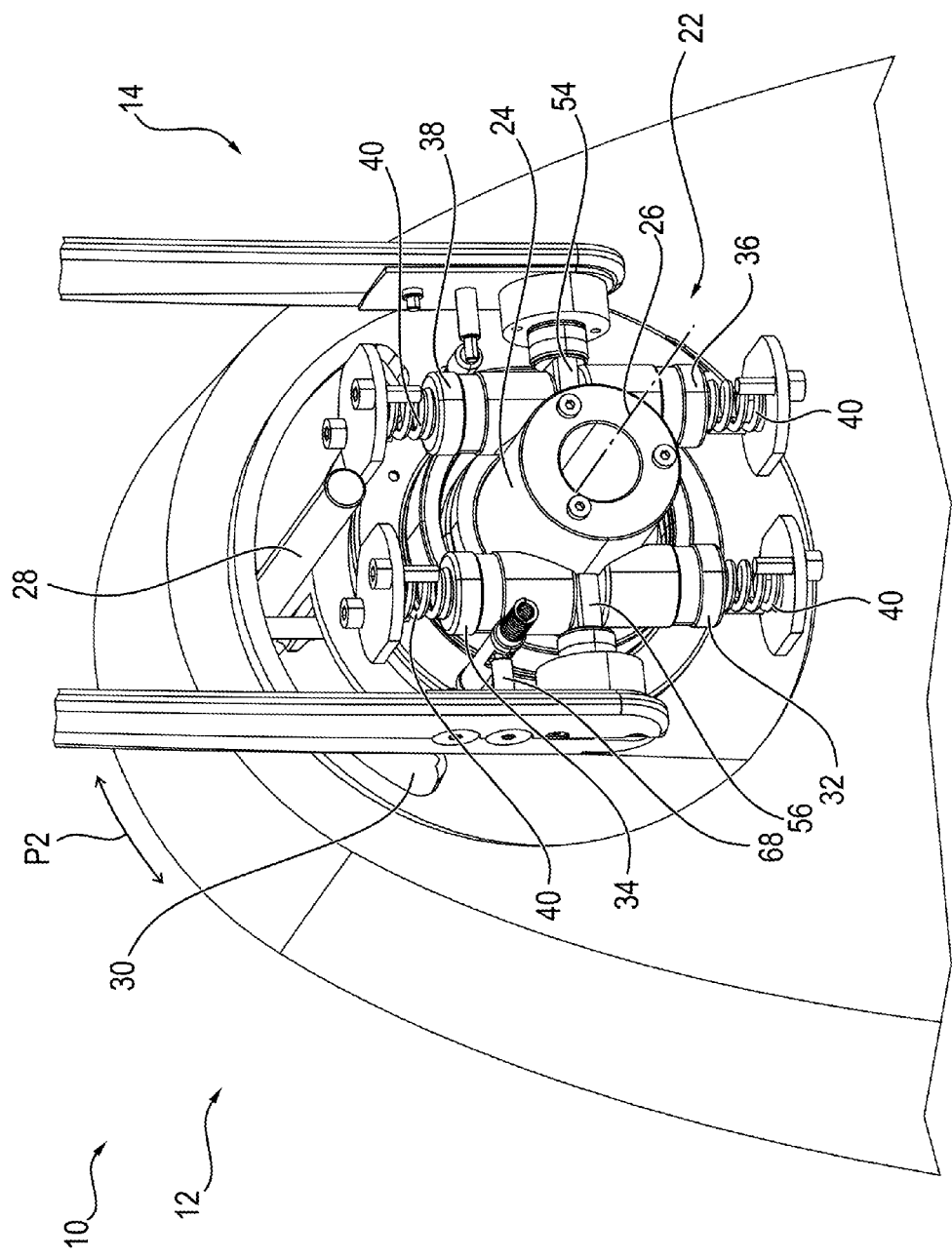
FIG. 2 is a schematic perspective depiction of a portion of the microscope, showing a brake unit.

FIG. 2 is a schematic perspective depiction of a portion of microscope 12, looking toward a brake unit 22 and showing the mounting of pivot unit 14 relative to stand body 12. Housing 16 of pivot unit 14 is, for this purpose, omitted. The upper part of pivot unit 14 is also not depicted, so that these internally located components can be made more visible.

Stand body 12 encompasses a shaft 24 on which pivot unit 14 is mounted rotatably around longitudinal axis 26 of shaft 24. Longitudinal axis 26 of shaft 24 thus constitutes the rotation axis of pivot unit 14.

Pivot unit 14 encompasses a rod 28 that is fastened fixedly on pivot unit 14 and is guided within a gate 30 of stand body 12. Gate 30 is embodied, in particular, in the shape of a circular segment, the center point of that circle being located on longitudinal axis 26. Gate 30 and the engaging rod 28 result on the one hand in movement guidance and on the other hand, in particular, in a limitation of the maximum possible pivoting.

Gate 30 is embodied in particular in such a way that it covers an angle of 120°, with the consequence that the pivot unit is pivotable, from a zero position shown in FIGS. 1 and 2, through 60° in both directions of double arrow P2. The zero position is that position at which the pivot unit is oriented uprightly, i.e. it is arranged centeredly above microscope stage 18, and the lateral housing parts of housing 16 are aligned vertically. In other words, the zero position is that position in which optical axis 15 of microscope 10 extends perpendicularly to the surface of microscope stage 18.

Figure 3:
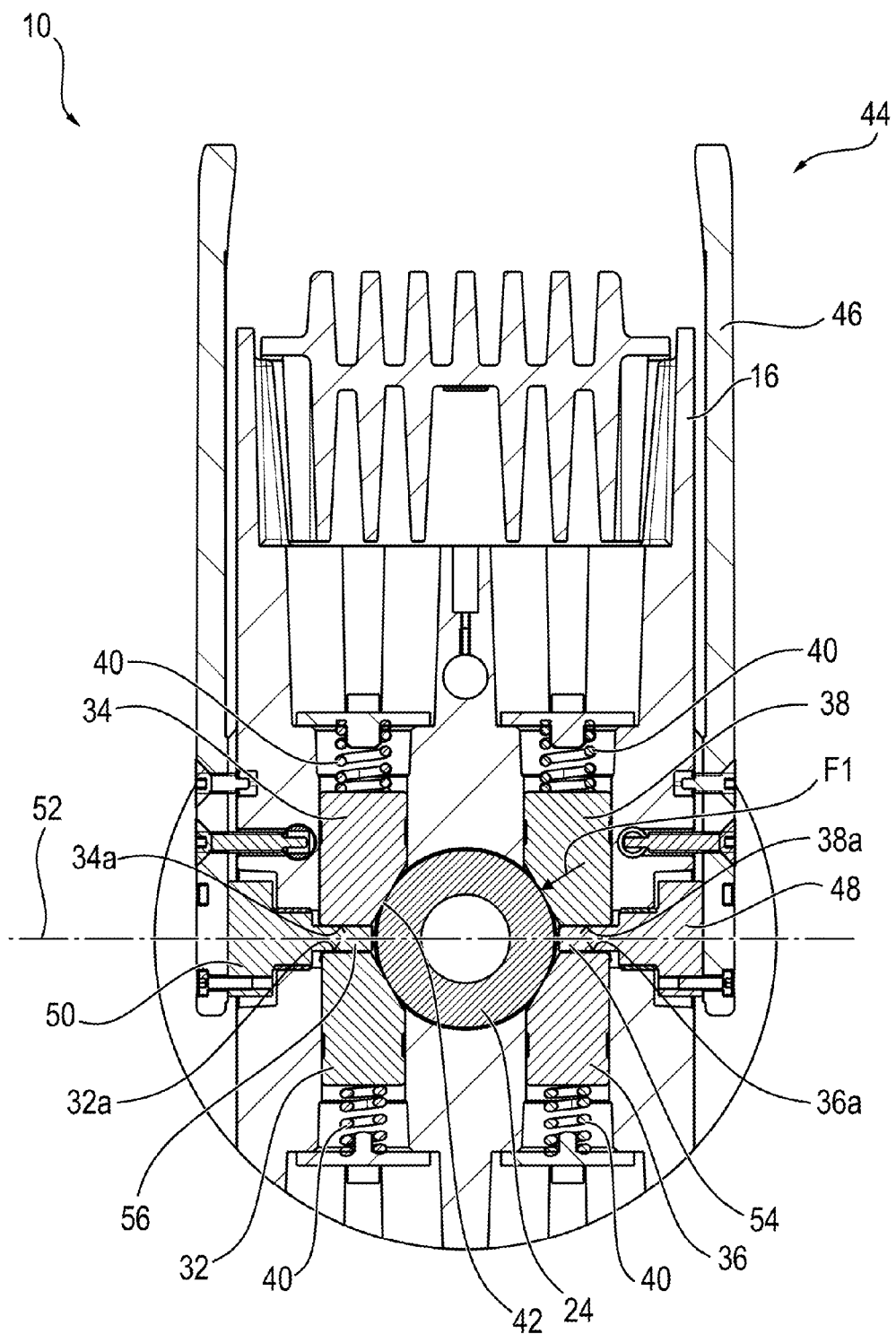
FIG. 3 is a sectioned depiction of a portion of the microscope according to FIGS. 1 and 2, showing the brake unit arranged in a braked position.
Figure 4:
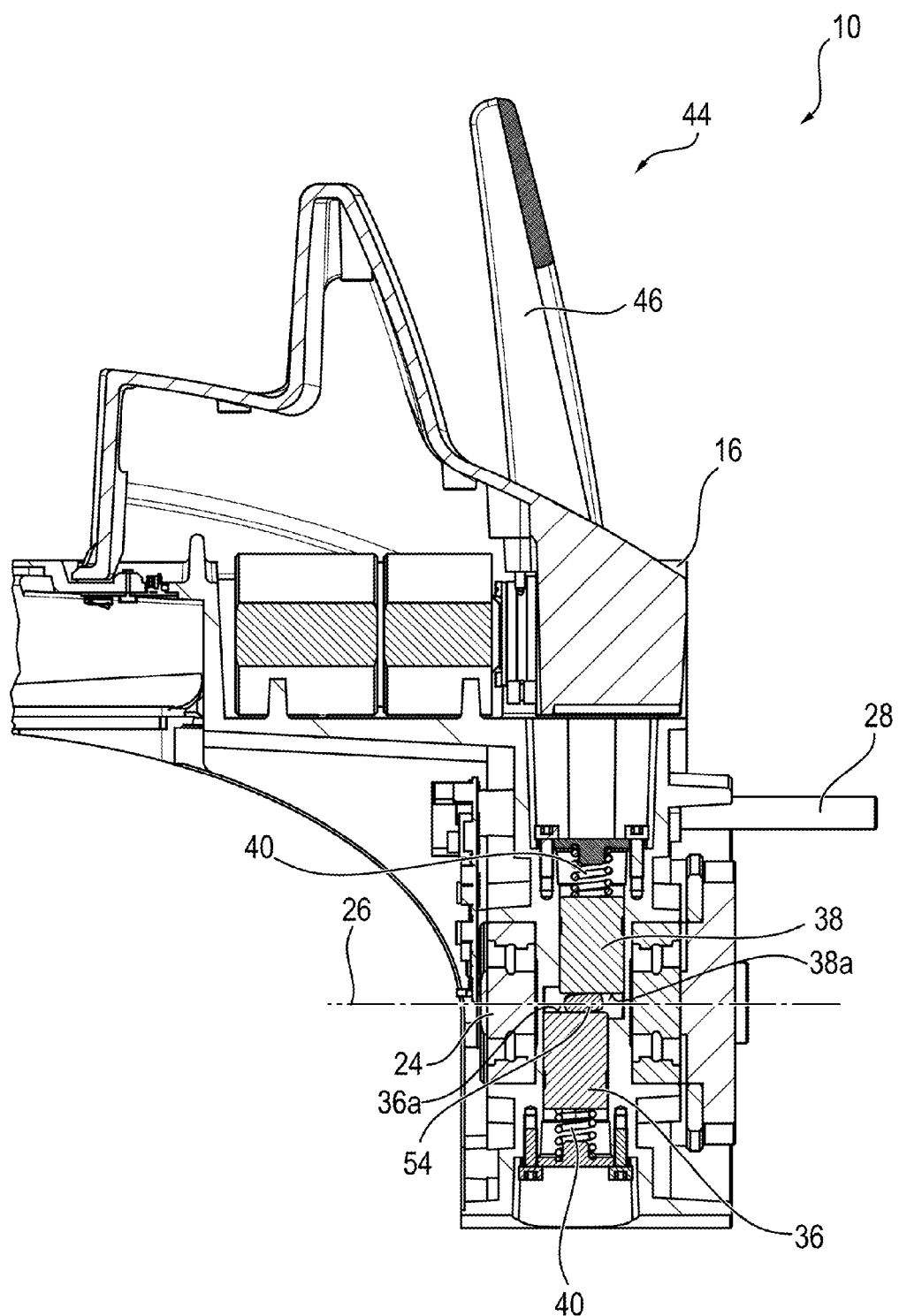
FIG. 4 is a further sectioned depiction of a portion of the microscope according to FIGS. 1 and 2, with a side view of the brake unit arranged in the braked position.

Brake unit 22, which comprises a total of four radial pistons 32 to 38, is provided in order to immobilize pivot unit 14 in a desired position and in order to brake its motion; said pistons are each biased via a spring 40 in such a way that they press against the surface of shaft 24 so that a frictional connection is formed, the force resulting therefrom serving respectively as a braking force or immobilizing force. FIGS. 3 and 4 are respective sectioned depictions of the portion of pivot unit 14 and of shaft 24, FIG. 3 being a plan view and FIG. 4 a side view. What is depicted in both Figures is a braked position in which radial pistons 32 to 38 are contacting the surface of shaft 24, and pivot unit 14 is thus immobilized.

Radial pistons 32 to 38 each comprise a beveled contact surface 42, the latter enclosing in particular an angle of between 45° and 70°, preferably an angle of approximately 60°, with end face 32a to 38a of the respective radial piston. The result of these beveled surfaces is that the radial pistons contact shaft 24 along the largest possible contact line, and exert on the shaft a force F1 by means of which the necessary friction is applied and thus immobilization of brake unit 22 is accomplished.

In an alternative embodiment more or fewer than four radial pistons 32 to 38, for example two radial pistons or six radial pistons, can also be provided. Contact surface 42 can moreover also have a different shape. For example, the shape of the contact surface can be adapted to that of shaft 24, so that force transfer is accomplished not only along a line, but in planar fashion.

Brake elements other than radial pistons 32 to 38 can moreover also be used, for example brake shoes.

In addition, other elastic elements, for example rubber or silicone blocks, can also be used instead of springs 40.

Brake unit 22 can be released with the aid of an actuation element 44. This actuation element 44 encompasses a lever 46 whose end facing away from brake unit 22 can be manually actuated by an operator. In a default position, for example as shown in FIGS. 1 and 2, this actuation element 44 is not actuated. In order to release brake unit 22, lever 46 must be moved by the operator out of said default position. In the exemplifying embodiment shown in FIGS. 1 and 2, lever 46 must be pulled by the operator toward him- or herself, so that simple operation is possible.

Actuation element 44 furthermore encompasses two intermediate elements 48, 50 by way of which lever 46 is mounted pivotably around a pivot axis 52 relative to housing 16. These intermediate elements 48, 50 furthermore comprise extensions 54, 56 that are each arranged between two mutually oppositely arranged radial pistons 32 to 38. In the braked position, the surfaces of these extensions 54, 56 and the end faces of radial pistons 32 to 38 are aligned approximately parallel to one another.

Figure 5:
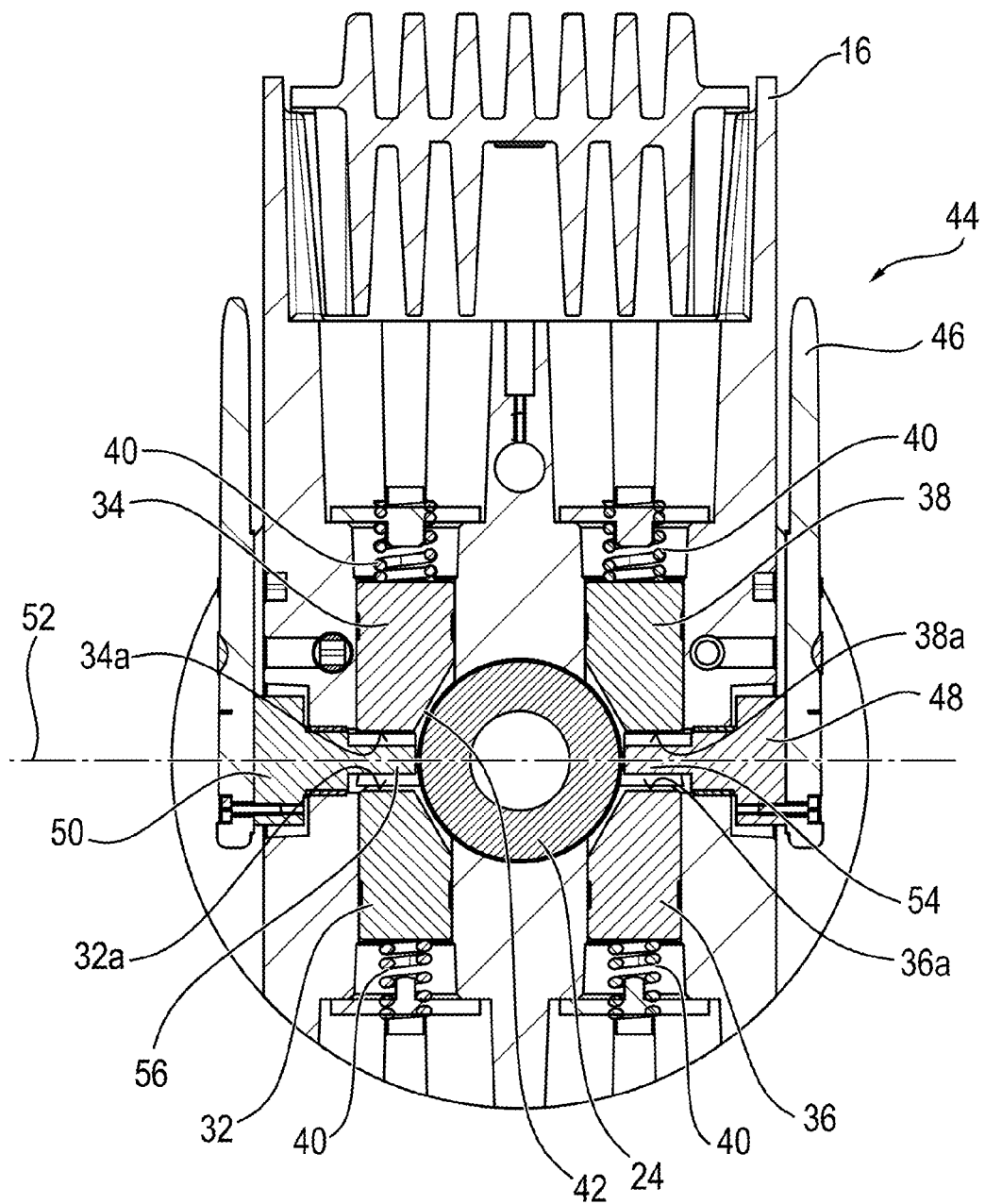
FIG. 5 is a sectioned depiction of a portion of the microscope according to FIGS. 1 and 2, with a brake unit arranged in a released position.
Figure 6:
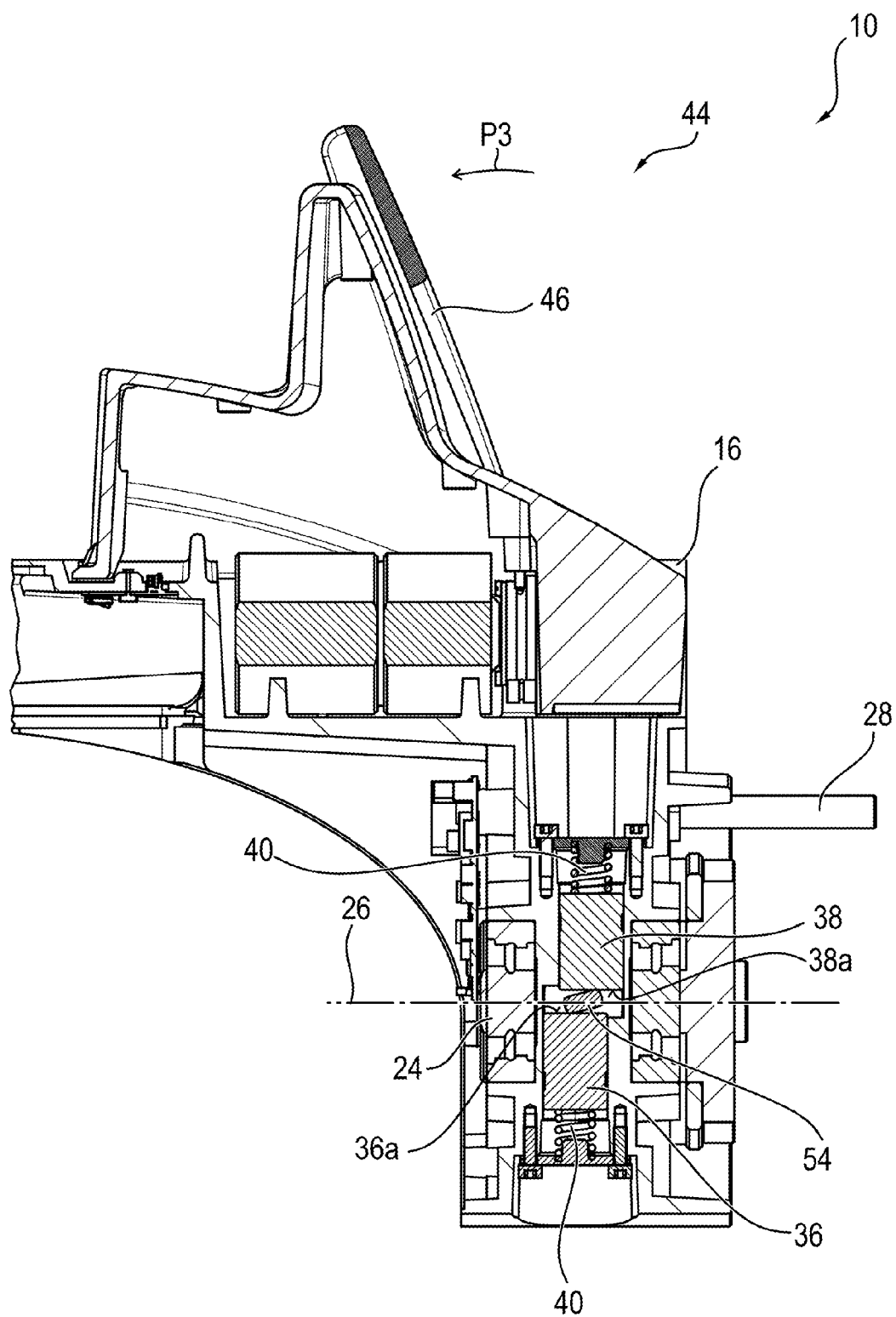
FIG. 6 is a sectioned depiction of a portion of the microscope according to FIGS. 1 and 2, with a side view of the brake unit arranged in the released position.

When lever 46 is moved from the operating position toward oneself, i.e. in the direction of arrow P3 (FIG. 6), intermediate elements 48, 50 are then pivoted together with lever 46, with the consequence that extensions 54, 56 become tilted, the result being that, as shown in the sectioned depictions of FIGS. 5 and 6, radial pistons 52 to 58 are moved out of the braked position, away from one another, toward a released position. In the released position shown in FIGS. 5 and 6, radial pistons 52 to 58 are moved sufficiently far away from one another that they no longer contact shaft 24 at all, so that no further braking force at all exists. Conversely, if lever 46 is not moved quite so far as in the case of the extreme situation in FIGS. 5 and 6, it may then be the case that radial pistons 32 to 38 are still in contact with shaft 24 but the force is less than in the braked position. Pivot unit 14 can thus be moved despite the braking force, but the braking force can thus be adjusted steplessly by the operator depending on how far he or she pulls lever 46. Precise positioning of the pivot units, in particular, is thus easily possible.

When the operator releases lever 46, however, radial pistons 32 to 38 are automatically moved back into the braked position by springs 40, so that brake unit 22 is automatically immobilized and inadvertent uncontrolled pivoting of pivot unit 14 is avoided.

A further effect of springs 40 of radial pistons 32 to 38, via the contact of radial pistons 32 to 38 with intermediate elements 48, 50, is that when lever 46 is released, it is automatically moved back into the default position without requiring further elastic elements for that purpose. Alternatively, however, further elastic elements for biasing lever 46 into the default position can also be provided.

Figure 7:
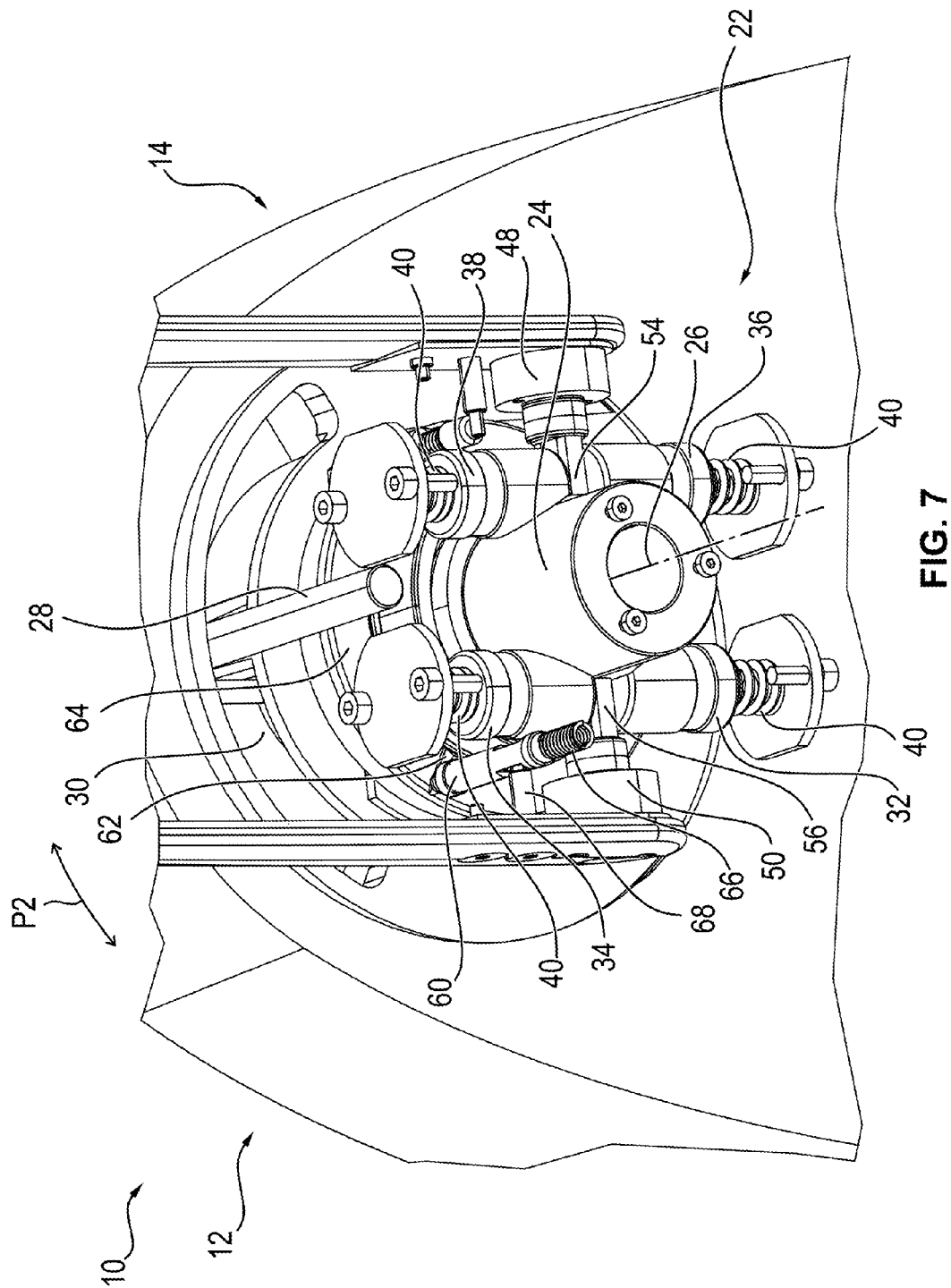
FIG. 7 is a further schematic perspective depiction of a portion of the microscope according to FIGS. 1 and 2, showing a click-stop mechanism.

FIG. 7 is a further schematic perspective depiction of the portion of microscope 10, here looking toward a latched connection serving as a "click-stop" mechanism. This latched connection is established between a first latching element embodied as pin 60 and a second latching element embodied as recess 62. Pin 60 is part of pivot unit 14, whereas recess 62 is provided in a ring 64 of stand body 12.

Figure 8:
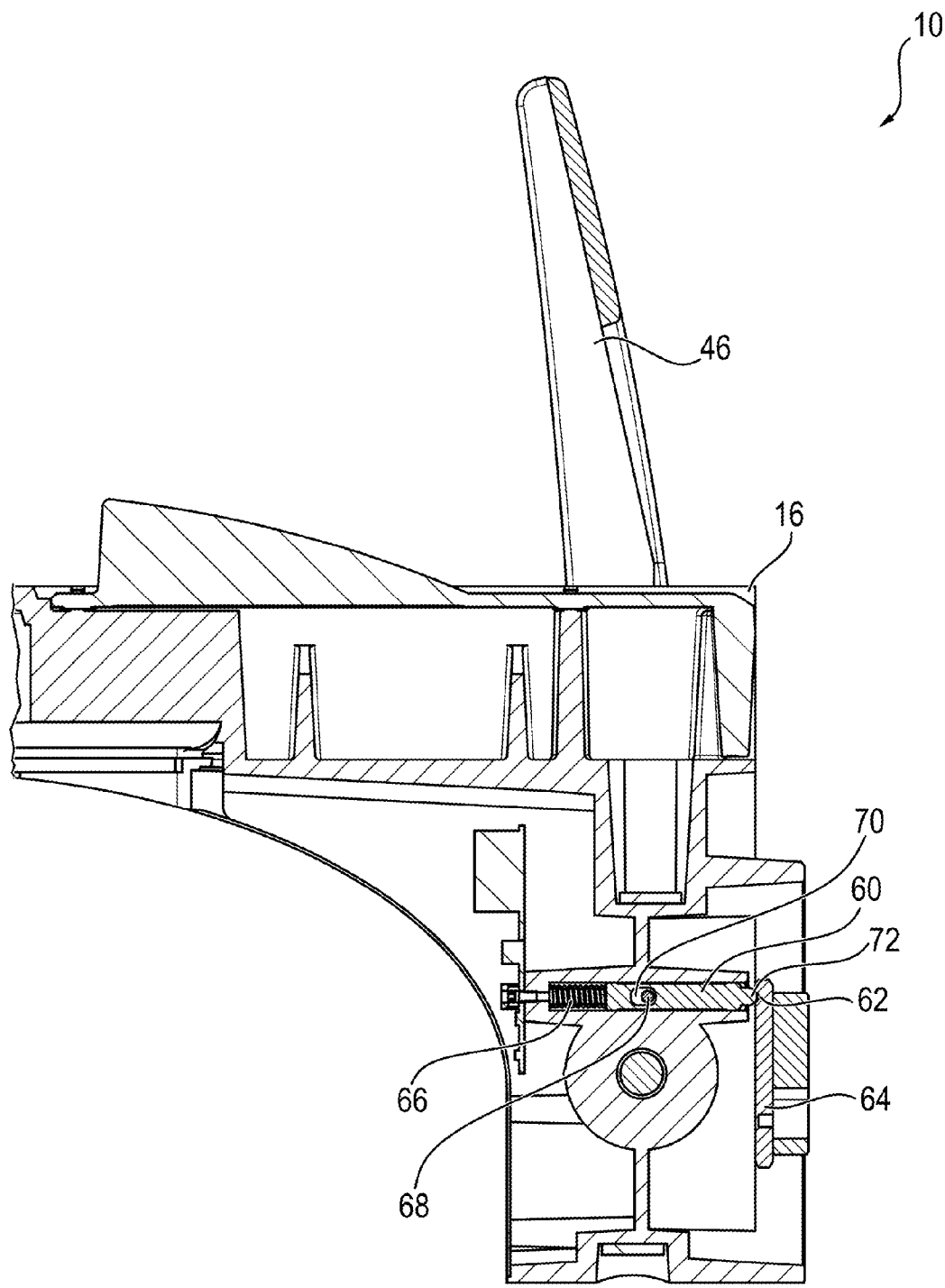
FIG. 8 is a sectioned depiction of a portion of the microscope according to FIGS. 1 and 2, with a latching element of the click-stop mechanism arranged in an initial position.
Figure 9:
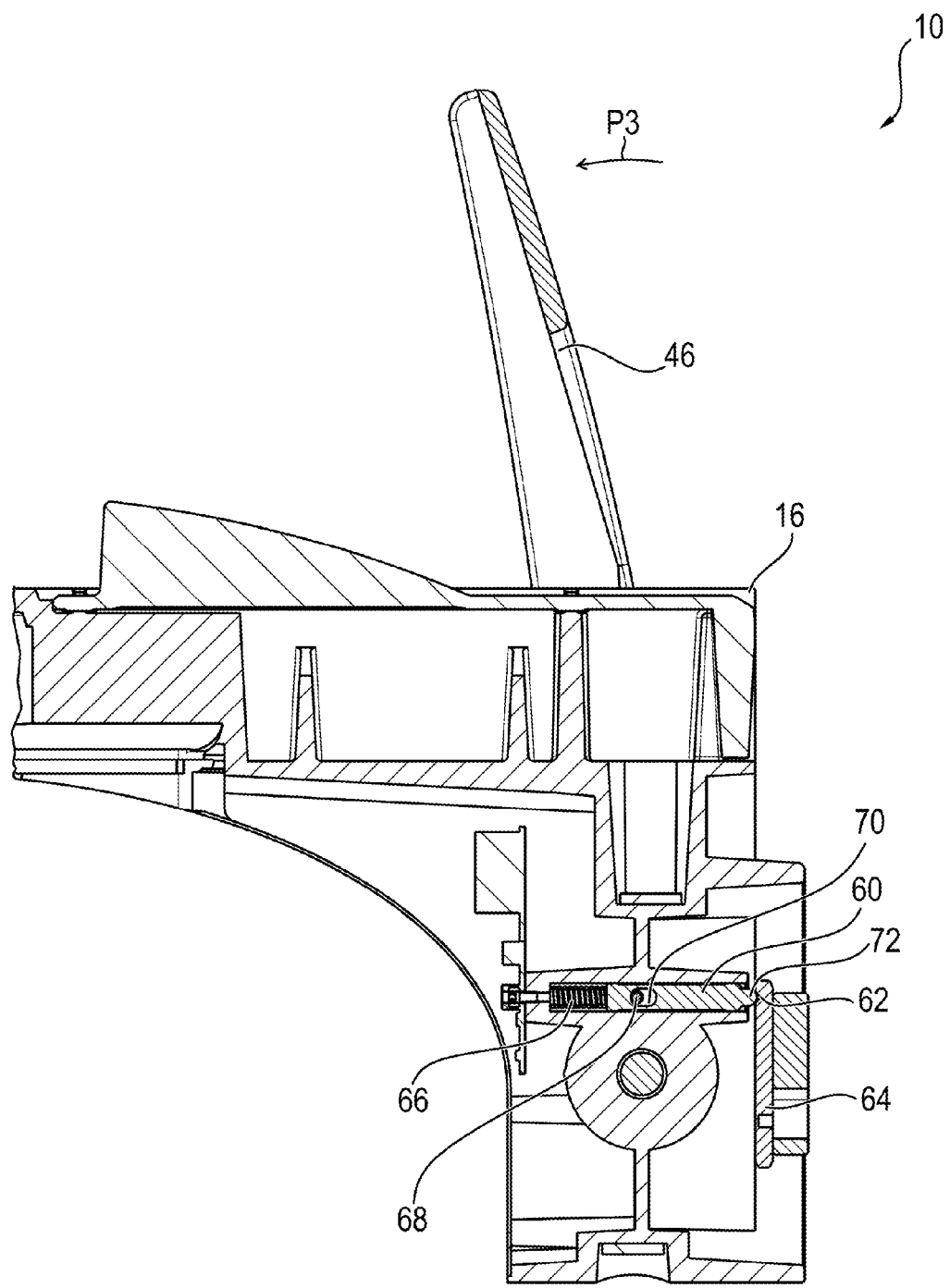
FIG. 9 is a sectioned depiction of a portion of the microscope according to FIGS. 1 and 2, an actuation element having been actuated in a first actuation range.
Figure 10:
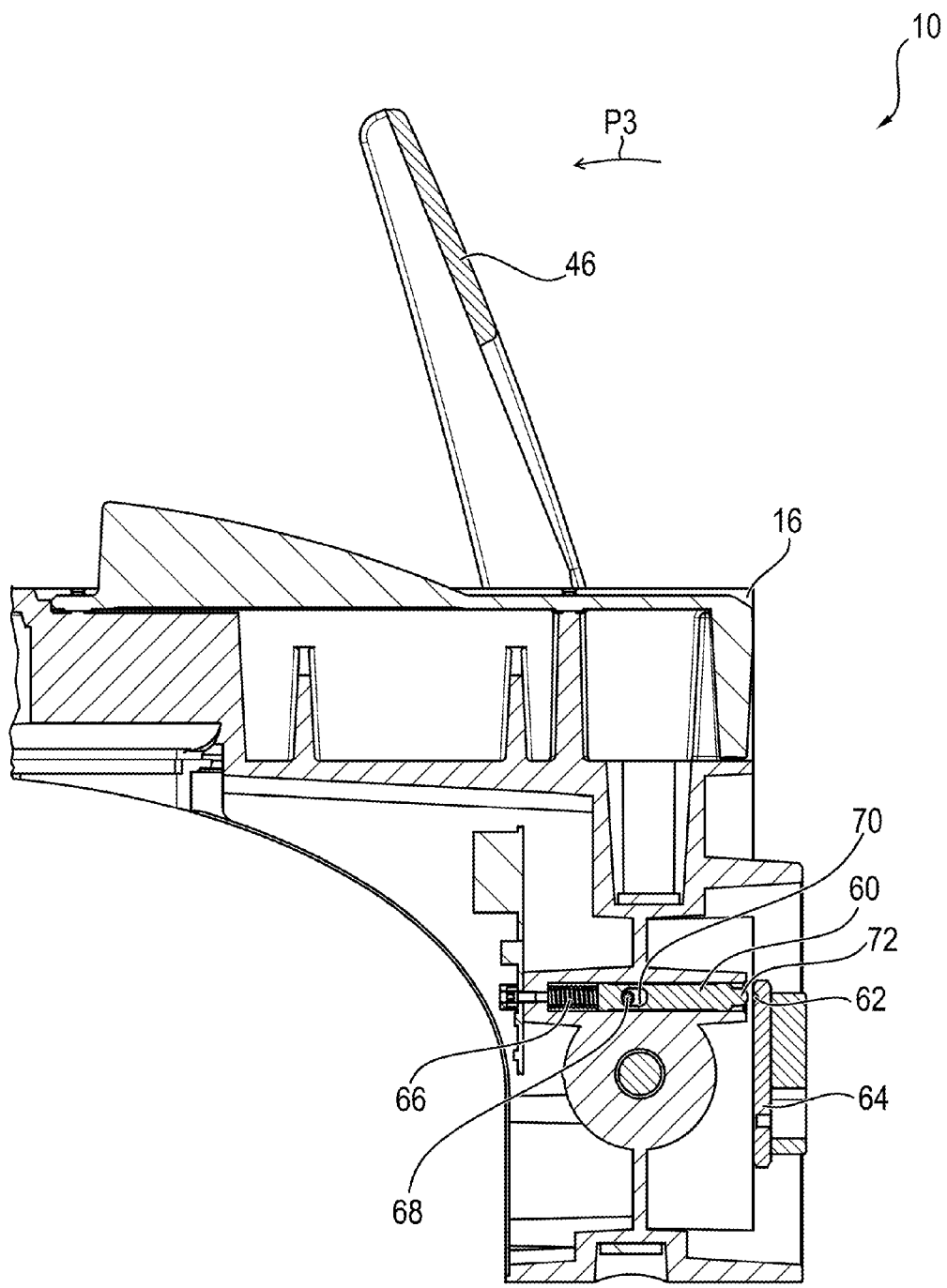
FIG. 10 is a sectioned depiction of a portion of the microscope according to FIGS. 1 and 2, with an actuation element actuated within a second actuation range.

FIGS. 8 to 10 are respective sectioned depictions of a portion of microscope 10 showing said click-stop mechanism, the section being selected so that pin 60 is sectioned. FIGS. 8 to 10 depict different positions of pin 60 that result as a function of the actuation of actuation element 44.

FIG. 8 depicts the state in which brake unit 22 is arranged in the braked position and lever 46 is thus unactuated and arranged in its default position. Pin 60 is biased into the initial position via an elastic element embodied as spring 66. When pivot unit 14 is arranged in its zero position, pin 60 that is arranged in the initial position engages into recess 62 so that a latched connection is established. Because brake unit 22 is arranged in the braked position when lever 46 is arranged in the default position, pivoting of pivot unit 14 is generally not possible.

Lever 46 is connected via a connecting pin 68 to pin 60, said connecting pin 68 projecting into an elongated hole 70 of pin 60.

When lever 46 is actuated out of the default position within a predetermined first actuation range, connecting pin 68 is then moved away from stand body 12 only sufficiently far that it is moved within elongated hole 70, but without moving pin 60 out of its initial position. This first actuation range corresponds approximately to half the maximum possible actuation travel of lever 46.

When lever 46 is actuated within this first actuation element, brake unit 22 is released at least sufficiently that it is possible for pivot unit 14 to pivot. When pivot unit 14 is moved out of the zero position, pin 60 is then moved out of its initial position via contact with ring 64 out of the initial position, and correspondingly slides on ring 64. In order to ensure this movement out of recess 62, recess 62 has, in particular, beveled edges and the pin has, in particular, a semi-spherical end 72 that engages into recess 62.

When pivot unit 14 is moved back into the zero position while lever 46 is still actuated within the first actuation range, pin 60 is automatically moved back into the initial position due to the return force of spring 66 when the zero position is reached and thus when recess 62 is reached, and thus latches into recess 62. The operator can perceive this latching-in haptically by way of corresponding vibrations and/or acoustically by way of a corresponding "click," so that the operator can return exactly to the zero position at any time.

If, however, the operator actuates lever 46 farther than the first actuation range, so that it is actuated within a predetermined second actuation range as depicted, for example, in FIG. 10, pin 60 is then, via contact with connecting pin 68, already moved against the return force of spring 66 sufficiently far out of the initial position that even when pivot unit 14 is arranged in the zero position, pin 60 does not latch into recess 62. This has the advantage that pivot unit 14 can be moved through the zero position while no corresponding latching-in occurs. This avoids vibration, for example, which is advantageous when acquiring videos during pivoting of pivot unit 14.

Figure 11:
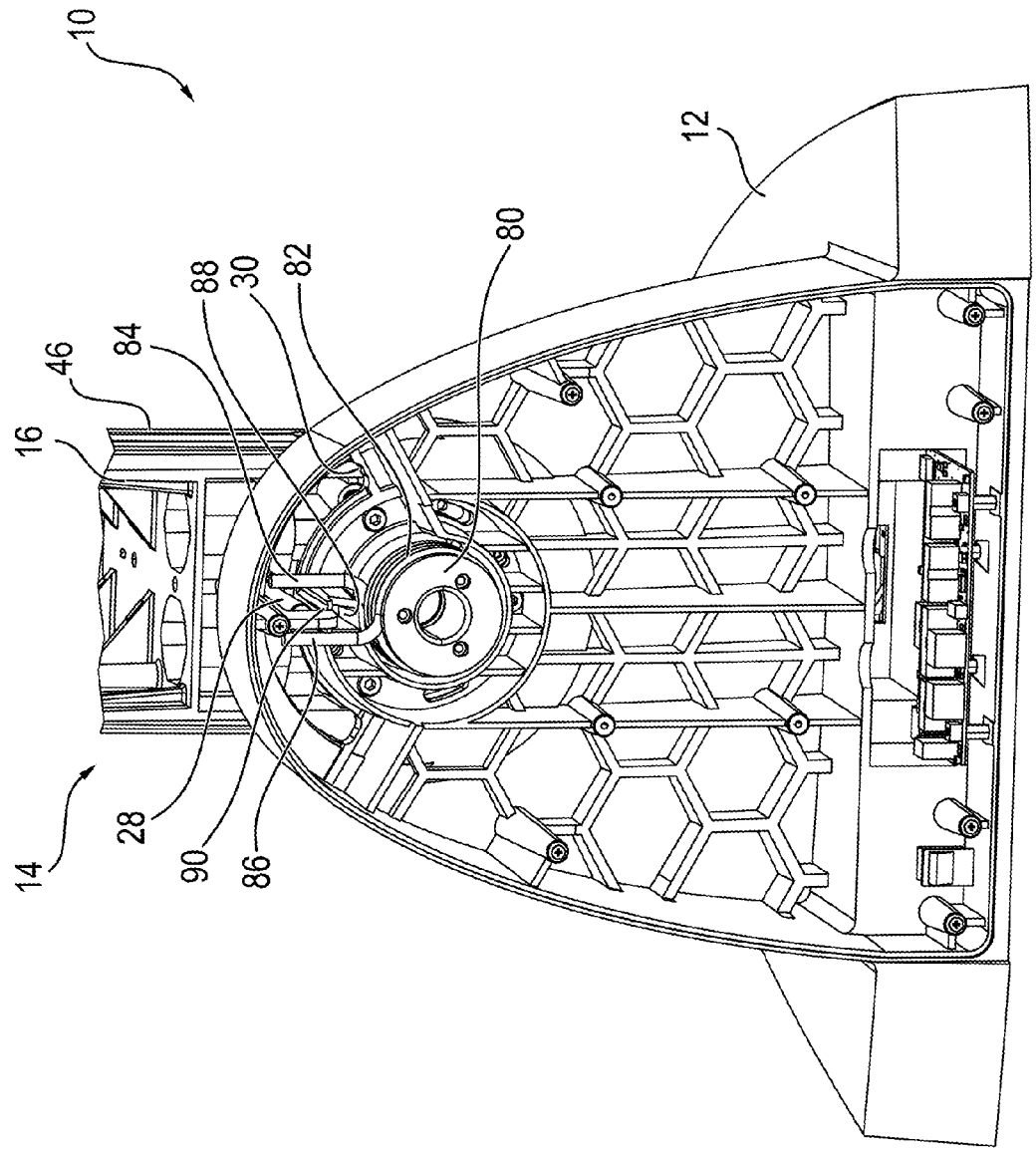
FIG. 11 is a schematic perspective depiction of the microscope according to FIGS. 1 and 2, showing a rear side of the microscope with housing parts omitted.

FIG. 11 is a further schematic perspective depiction of microscope 10 looking toward its rear side, a rear wall of the housing of stand body 12 being omitted in order to make the internally located components visible.

Arranged inside the housing of stand body 12 is a stub shaft 80 that is arranged, in particular, coaxially with shaft 24. In an alternative embodiment, stub shaft 80 and shaft 24 can also be embodied integrally.

A torsion spring 82 is mounted on this stub shaft 80 in such a way that its turns extend around stub shaft 80, so that the axis of torsion spring 82 is also arranged coaxially with stub shaft 80 and thus with shaft 24, and thus in turn with rotation axis 26 of pivot unit 14.

The two ends 84, 86 of the wire of torsion spring 82 are bent upward and are arranged in such a way that a gap 88 is embodied between them. That end of rod 28 which faces away from pivot unit 14 projects into this gap 88. Also arranged in this gap 88 is a projection 90 connected fixedly to stand body 12.

Figure 12:
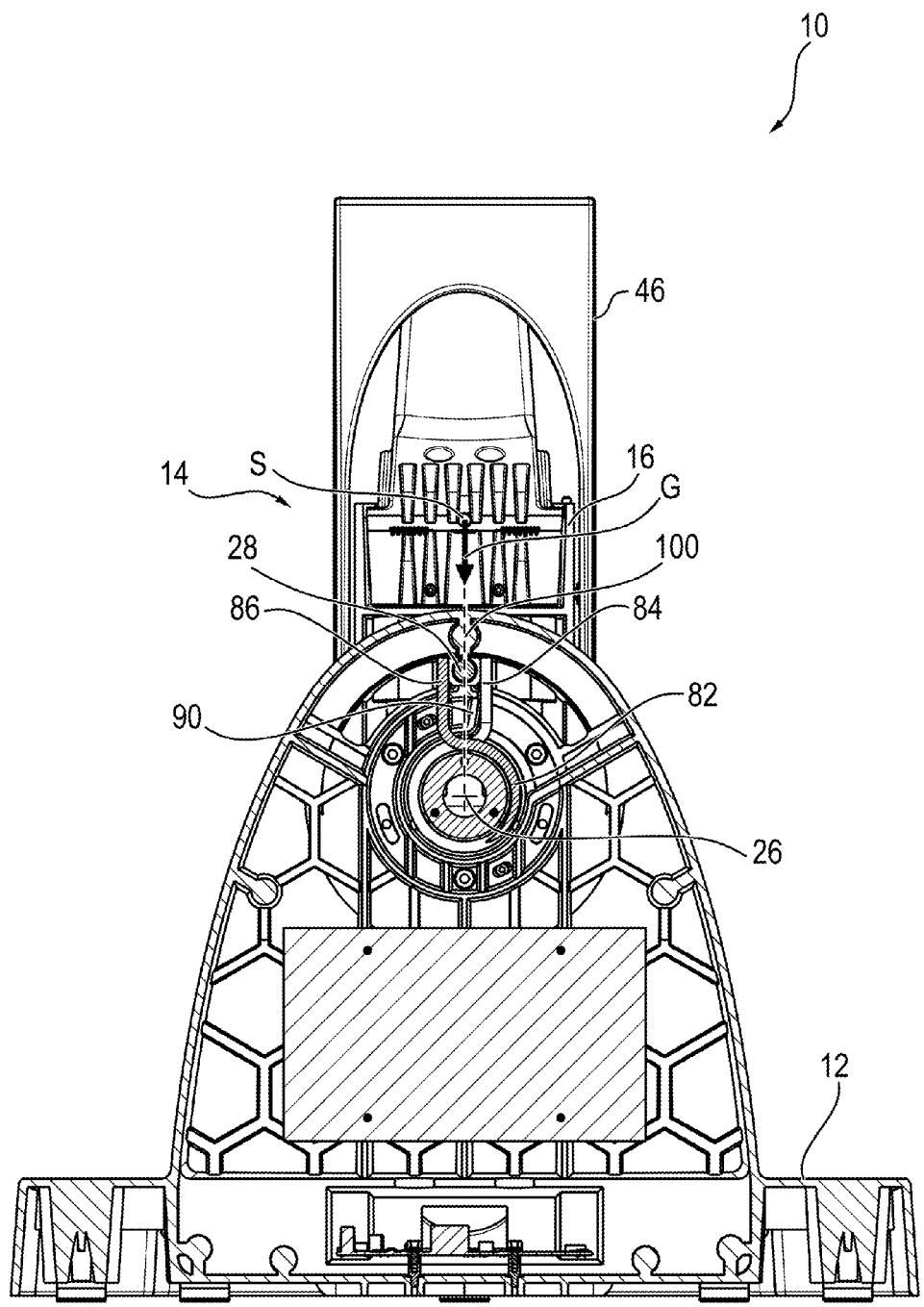
FIG. 12 is a sectioned depiction of the microscope according to FIGS. 1 and 2, the pivot unit being arranged in a zero position.
Figure 13:
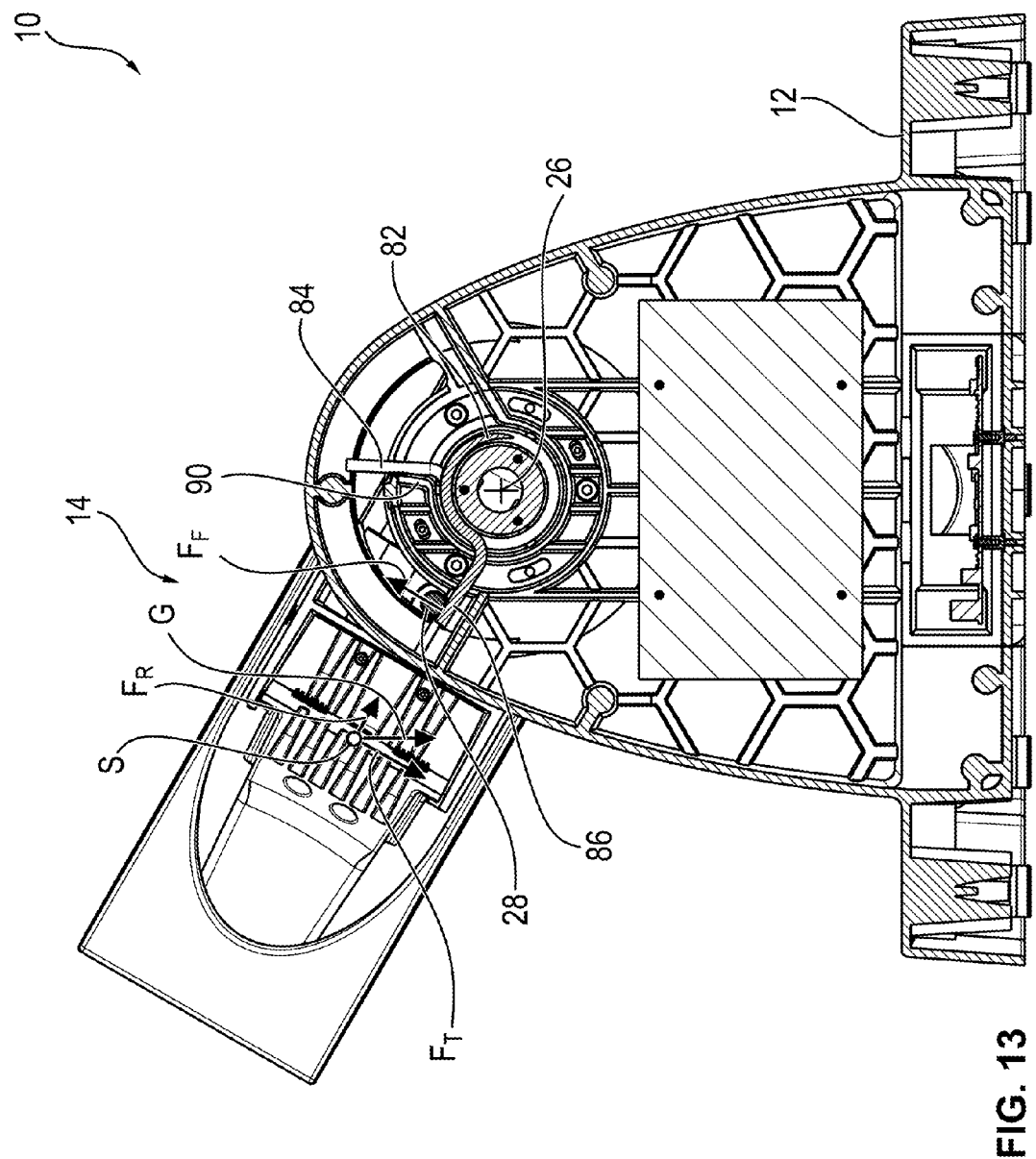
FIG. 13 is a further sectioned depiction of the microscope according to FIGS. 1 and 2, the pivot unit being pivoted out of the zero position into a first position.
Figure 14:
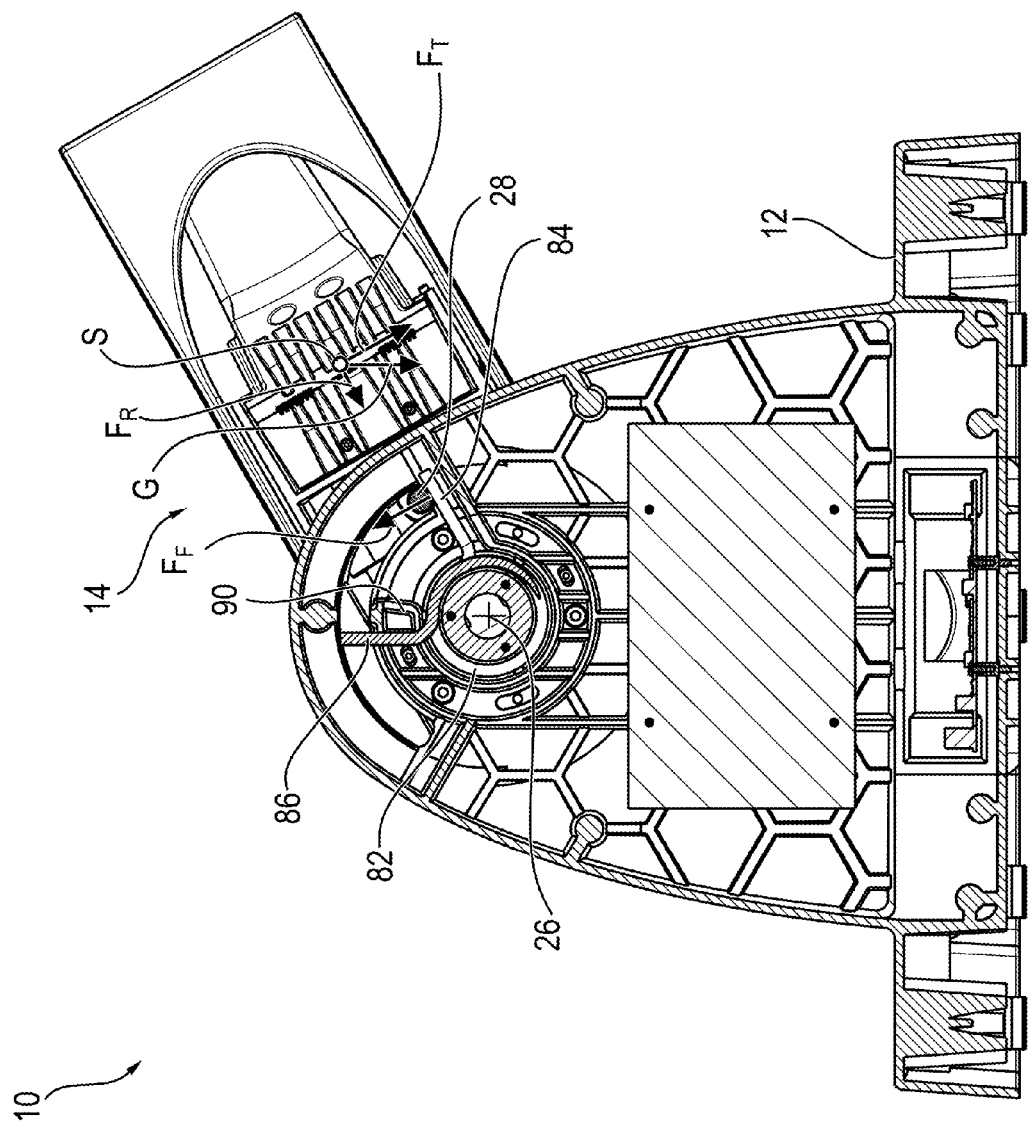
FIG. 14 is a further sectioned depiction of the microscope according to FIGS. 1 and 2, the pivot unit being moved out of the zero position into a second position.

FIGS. 12 to 14 are respective sectioned depictions of microscope 10, the section being placed so that the front end 86, viewed from the rear side, is sectioned. In FIG. 12, pivot unit 14 is arranged in the zero position. In this zero position, rod 90 does not contact either of the two spring ends 84, 86 and torsion spring 82 is not loaded, so that no force and no moment are exerted by it on pivot unit 14.

If the weight of pivot unit 14 is regarded as a concentrated force G that acts at the center of gravity S of pivot unit 14, then in the zero position the vertical of that force G, called the "gravity vertical" 100, extends through rotation axis 26 of pivot unit 14, so that no torque around rotation axis 26 is generated by weight G.

In FIG. 13, pivot unit 14 is pivoted out of the zero position approximately 60° to the left in a first direction. Torsion spring 82 braces with its second end 86 against projection 90, the other end 84 of the torsion spring being concurrently moved via rod 28, so that torsion spring 82 becomes loaded and exerts a return force $F_F$ on rod 28 and thus on pivot unit 14.

When pivot unit 14 is pivoted out of the zero position, gravity vertical 100 is then no longer directed so that it intersects rotation axis 26. The weight G can instead, in accordance with a parallelogram of forces, be divided into a radial force $F_R$ and a tangential force $F_T$. This radial force $F_R$ is directed toward rotation axis 26, so that it generates no torque around rotation axis 26. The tangential force $F_T$, on the other hand, generates a corresponding torque (tangential moment) $M_T$ around rotation axis 26, by which pivot unit 14 is pulled downward.

The return force $F_F$ of the spring is directed oppositely to the tangential force $F_T$ and parallel to it, so that it likewise generates a torque, called the "return moment" $M_R$, around rotation axis 26, although it is directed oppositely to the tangential moment $M_T$ and is thus referred to as a "countermoment." The moment resulting from the torque $M_T$ generated by the tangential force $F_T$, and from the counter-moment, is thus less than the tangential moment $M_T$ generated by the tangential force $F_T$. The consequence of this is that an operator needs to apply less force in order to move pivot unit 14 toward the zero position. The dimensions of brake unit 22 can furthermore be smaller, since in order to immobilize pivot unit 14 in a desired position it thus needs to apply only a smaller braking force, specifically one that only needs to compensate for the resultant moment.

FIG. 14 shows the pivoting of pivot unit 14 in the direction opposite to the deflection as seen in FIG. 13. In this case first end 84 of the spring braces against projection 90, whereas second end 86 of the spring is entrained by rod 28. Thanks to the symmetrical embodiment of torsion spring 82 and the symmetrical arrangement, once again a return moment $M_{RF}$ is generated which is directed oppositely to the tangential moment $M_T$ of pivot unit 14 and has the same magnitude as in the case of the same deflection in the other direction. By way of the strength of torsion spring 82 that is used, it is possible to adjust the magnitude of the return force and thus of the return moment $M_R$, and thus the magnitude of the residual resultant moment.

Figure 15:
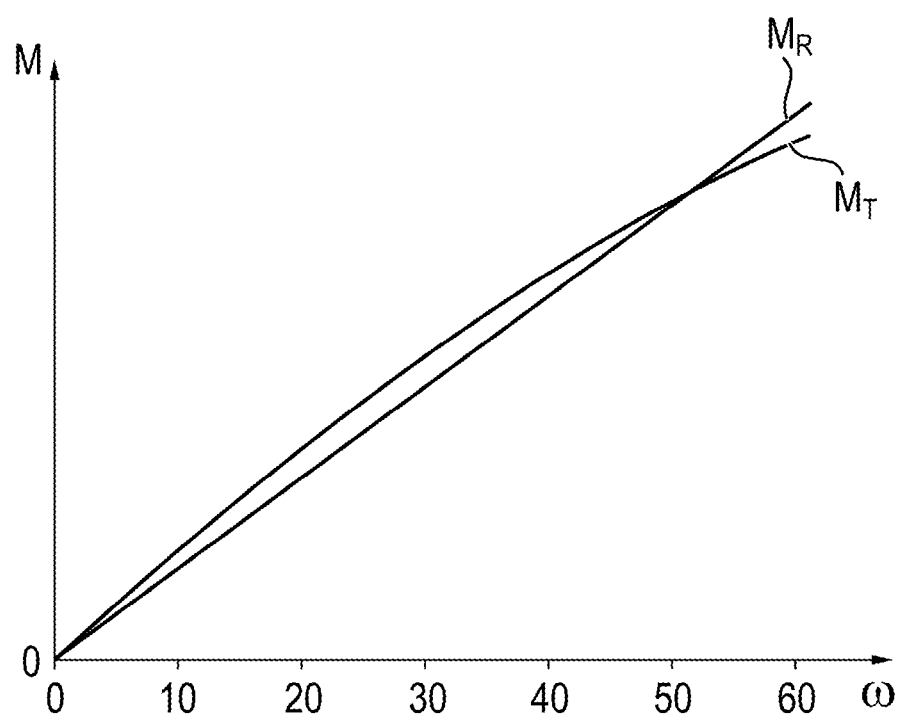
FIG. 15 is a diagram of the forces acting as a function of the pivot angle of the pivot unit, according to a first embodiment.

In a first embodiment shown in FIG. 15, torsion spring 82 is selected in such a way that the return moment $M_R$ for a pivoting motion of 50° out of the zero position is of approximately the same magnitude as the tangential moment $M_T$, so that no resultant moment remains. Upon pivoting of more than 50° out of the zero position the return moment $M_R$ is greater than the tangential moment $M_T$, so that a negative resultant moment is produced.

Figure 16:
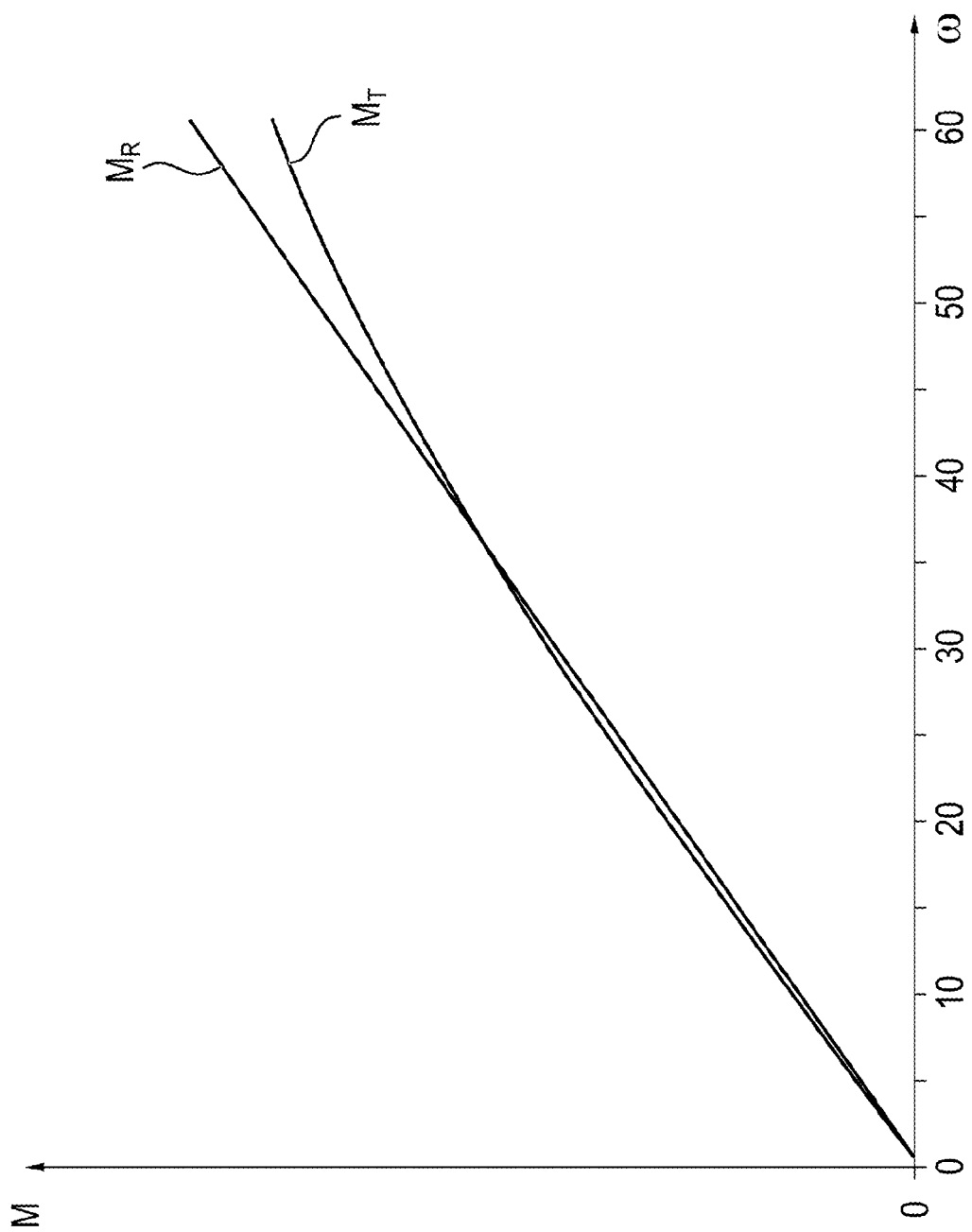
FIG. 16 is a diagram of the forces acting as a function of the pivot angle of the pivot unit, according to a second embodiment.

In a second embodiment shown in FIG. 16, torsion spring 82 is selected in such a way that the return moment $M_R$ for a pivoting motion of 38° out of the zero position is of approximately the same magnitude as the tangential moment $M_T$, so that no resultant moment remains. Upon pivoting of more than 38° out of the zero position the return moment $M_R$ is greater than the tangential moment $M_T$, so that a negative resultant moment is produced.

Figure 17:
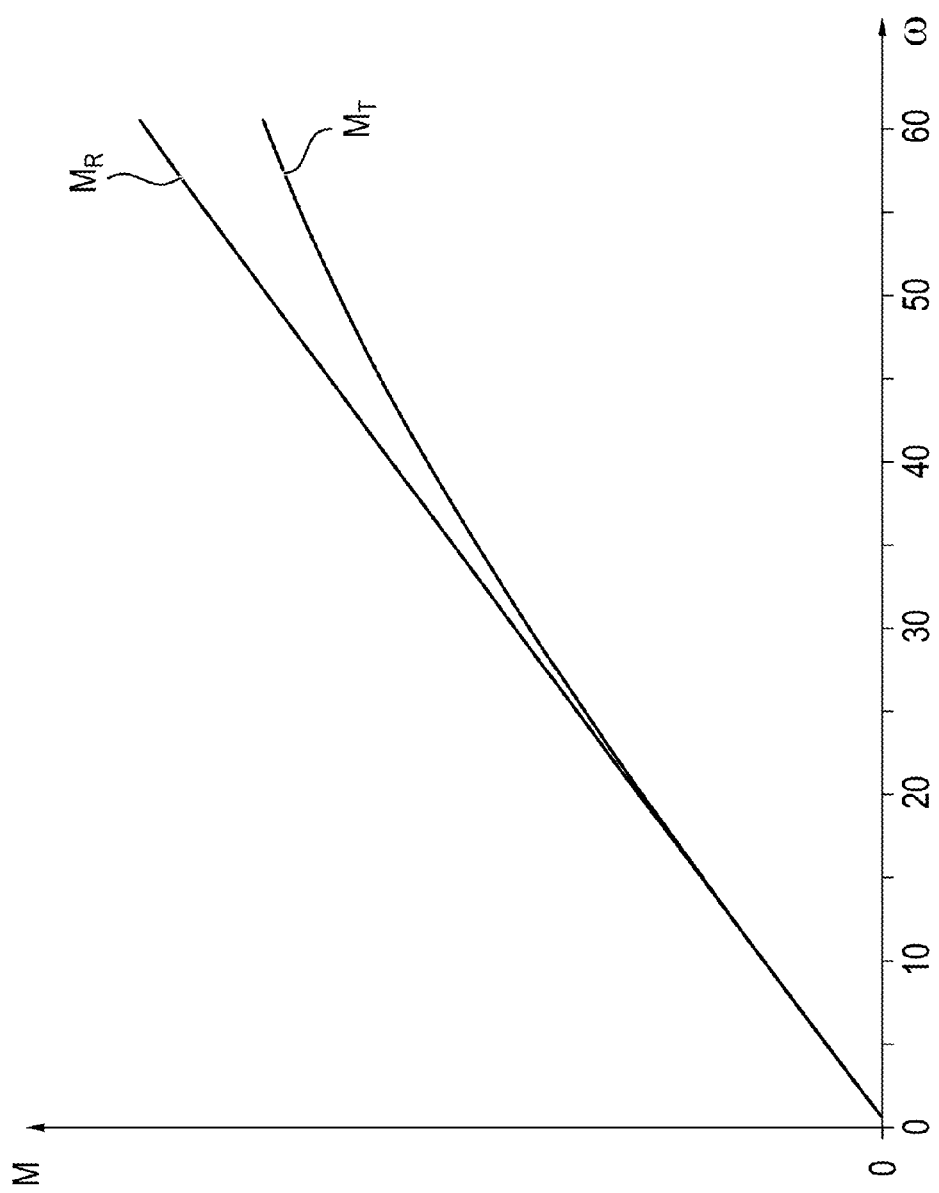
FIG. 17 is a diagram of the forces acting as a function of the pivot angle of the pivot unit, according to a third embodiment.

In a third embodiment shown in FIG. 17, torsion spring 82 is selected in such a way that the return moment $M_R$ is always greater than or equal to the tangential moment $M_T$, so that the resultant moment is always less than or equal to zero.

Figure 18:
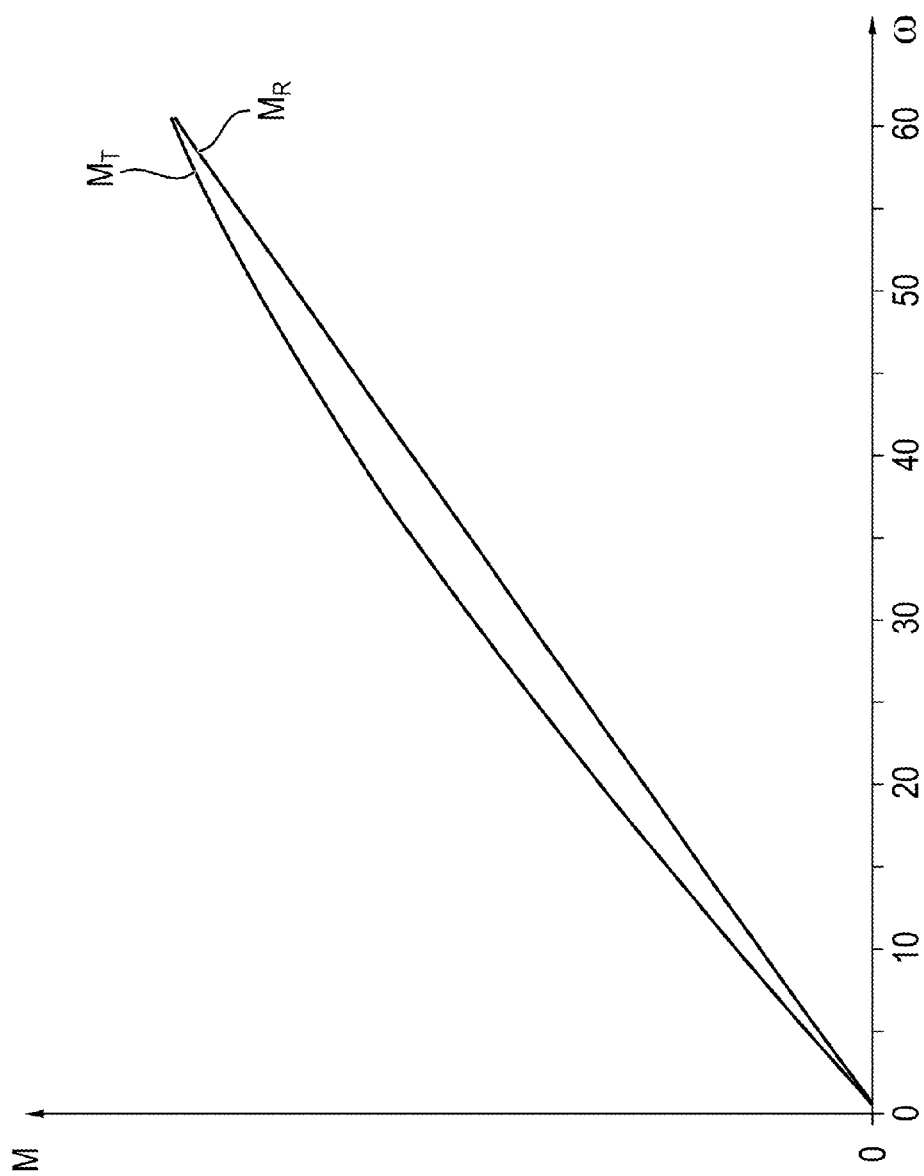
FIG. 18 is a diagram of the forces acting as a function of the pivot angle of the pivot unit, according to a fourth embodiment.

In a fourth embodiment shown in FIG. 18, torsion spring 82 is selected in such a way that the return moment $M_R$ is always less than the tangential moment $M_T$ or equal to the tangential moment $M_T$, so that the resultant moment is always greater than zero. With this embodiment, unlike with the other embodiments, pivot unit 16 is not prevented from abutting against a stop in order to limit the maximum pivot angle of pivot unit 16, but a result of this embodiment is also that the operator needs to exert less force for pivoting, and that the required braking force of brake unit 22 is smaller. In particular, upon pivoting through the maximum possible angle out of the zero position, the return moment $M_R$ is of the same magnitude as the tangential moment $M_T$.

In all the embodiments, the torsion spring is selected in such a way that over the entire pivoting range, the return moment $M_R$ corresponds to 0.8 times to 1.2 times the tangential moment $M_T$. What is achieved thereby is that the resultant moment $M_R$ is always equal to at most +/−20% of the tangential moment $M_T$, and thus the force to be applied by the operator or by brake unit 22 is always small, and pivot unit 22 is thus prevented from springing away in both directions when brake unit 22 is released.

In an alternative embodiment of the invention, other types of springs and other elastic elements can also be used instead of torsion spring 82.

PARTS LIST

10 Microscope
12 Stand body
14 Pivot unit
15 Optical axis
16 Housing
18 Microscope stage
20 Adjusting wheels
22 Brake unit
24 Shaft
26 Rotation axis
28 Rod
30 Gate
32 to 38 Radial piston
32a to 38a End surface
40 Spring
42 Contact surface
44 Actuation element
46 Lever
48, 50 Intermediate element
52 Pivot axis
54, 56 Extension
60 Pin
62 Recess
64 Ring
66 Spring
68 Connecting pin
70 Elongated hole
72 End
80 Stub shaft
82 Torsion spring
84, 86 End
88 Gap
90 Projection
100 Gravity vertical
F1, $F_F$, $F_R$, $F_T$, G Force
$M_R$, $M_T$ Moment
S Center of gravity
P1 to P3 Direction

What is claimed is:

1. A digital microscope comprising:
a stationary stand body including a shaft having a longitudinal axis;
a pivot unit mounted on the shaft of the stand body pivotably about the longitudinal axis of the shaft, the pivot unit including an image sensing unit for acquiring images of objects to be examined microscopically;
a brake unit for braking and/or immobilizing the pivot unit; and
an actuation element for releasing the brake unit,
the pivot unit including a first connecting element,
the stand body including a second connecting element,
the first connecting element and the second connecting element being coupled to one another when the pivot unit is in a predetermined zero position and the actuation element is in an unactuated default position,
the first connecting element and the second connecting element being coupled to one another when the pivot unit is in the zero position and the actuation element is actuated within a predetermined first actuation range, and
an elastic element arranged to exert, upon pivoting of the pivot unit out of a predetermined zero position, a return moment on the pivot unit, wherein the following equation is satisfied at least in a portion of a pivoting range of the pivot unit:

$$M_R >= M_T$$

$M_R$ = return moment of the elastic element
$M_T$ = tangential moment of a weight of the pivot unit.

2. The microscope according to claim 1, wherein when the pivot unit is in the zero position and the actuation element is actuated within a predetermined second actuation range, the first connecting element and the second connecting element are not coupled to one another.

3. The microscope according to claim 2, wherein the first actuation range is arranged between the default position and the second actuation range.

4. The microscope according to claim 2, wherein both upon an actuation of the actuation element within the first actuation range and upon an actuation of the actuation element within the second actuation range, the brake unit is released at least sufficiently far that pivoting of the pivot unit is possible.

5. The microscope according to claim 1, wherein the actuation element is movable out of the default position over a predetermined maximum actuation travel; and the first actuation range covers approximately a first half of the maximum actuation travel.

6. The microscope according to claim 1, wherein the first and the second connecting elements are configured to automatically uncouple from one another upon pivoting of the pivot unit out of the zero position provided the actuation element is actuated within the first actuation range.

7. The microscope according to claim 6, wherein the first and the second connecting elements are configured to output an acoustic, haptic, and/or optical signal when uncoupled from one another upon pivoting of the pivot unit.

8. The microscope according to claim 7, wherein the first and the second connecting elements are configured to output a "click" sound when uncoupled from one another upon pivoting of the pivot unit.

9. The microscope according to claim 1, wherein the first and the second connecting elements are configured to automatically couple with one another upon pivoting of the pivot unit into the zero position provided the actuation element is actuated within the first actuation range.

10. The microscope according to claim 9, wherein the first and the second connecting elements are configured to output an acoustic, haptic, and/or optical signal when coupled with one another upon pivoting of the pivot unit.

11. The microscope according to claim 10, wherein the first and the second connecting elements are configured to output a "click" sound when coupled with one another upon pivoting of the pivot unit.

12. The microscope according to claim 2, wherein:
the first connecting element is linearly displaceable along a predetermined path;
when the actuation element is in the default position, the first connecting element is in an initial position in which the first connecting element engages into the second connecting element when the pivot unit is in the zero position; and
the first connecting element is coupled purely mechanically to the actuation element such that upon an actuation of the actuation element within the first actuation range, the first connecting element latches at least partly into the second connecting element, provided the pivot unit is in the zero position, and upon an actuation of the actuation element within the second actuation range, the first connecting element does not latch into the second connecting element even when the pivot unit is in the zero position.

13. The microscope according to claim 12, wherein the first connecting element is biased into the initial position by an elastic element.

14. The microscope according to claim 1, wherein the first connecting element is a pin and the second connecting element is a recess.

15. The microscope according to claim 14, wherein the pin has a semi-spherical end, and the recess is a semi-spherical recess.

16. The microscope according to claim 14, wherein the pin comprises an elongated hole into which a further pin fixedly connected to the actuation element engages, the elongated hole being configured such that upon actuation of the actuation element within the first actuation range, the further pin is moved inside the elongated hole without moving the pin.

17. The microscope according to claim 1, wherein the brake unit comprises a brake element biased by an elastic element into a braked position in which the brake element contacts the shaft in the braked position, the brake element is movable by manual actuation of the actuation element against a return force of the elastic element from the braked position into a released position, and the actuation element is coupled to the brake element.

18. The microscope according to claim 1, wherein the shaft is hollow.

19. The microscope according to claim 1, wherein the pivot unit comprises a zoom system and/or an objective system having multiple objectives introducible into a beam path of the microscope.

* * * * *